United States Patent
Roy et al.

(10) Patent No.: US 10,240,022 B2
(45) Date of Patent: Mar. 26, 2019

(54) DEGRADABLE POLYMERIC MATERIAL

(71) Applicant: Schlumberger Technology Corporation, Sugar Land, TX (US)

(72) Inventors: Indranil Roy, Missouri City, TX (US); Shitong S. Zhu, Waban, MA (US); Miranda Amarante, Somerville, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 18 days.

(21) Appl. No.: 15/274,592

(22) Filed: Sep. 23, 2016

(65) Prior Publication Data

US 2018/0086894 A1    Mar. 29, 2018

(51) Int. Cl.
| | |
|---|---|
| *C08K 3/08* | (2006.01) |
| *E21B 29/02* | (2006.01) |
| *E21B 43/26* | (2006.01) |
| *C08J 5/00* | (2006.01) |
| *E21B 33/134* | (2006.01) |
| *E21B 33/14* | (2006.01) |
| *E21B 43/10* | (2006.01) |
| *E21B 43/14* | (2006.01) |
| *E21B 33/12* | (2006.01) |

(52) U.S. Cl.
CPC ............. *C08K 3/08* (2013.01); *C08J 5/00* (2013.01); *E21B 29/02* (2013.01); *E21B 33/134* (2013.01); *E21B 43/26* (2013.01); *C08K 2003/0812* (2013.01); *E21B 33/12* (2013.01); *E21B 33/14* (2013.01); *E21B 43/10* (2013.01); *E21B 43/14* (2013.01)

(58) Field of Classification Search
CPC ... C08K 3/08; C08K 2003/0812; E21B 29/02; E21B 33/12; E21B 33/14; E21B 43/10; E21B 43/14; E21B 43/26; E21B 43/16

USPC .......................................................... 524/441
See application file for complete search history.

(56) References Cited

U.S. PATENT DOCUMENTS

| | | | |
|---|---|---|---|
| 9,915,116 B2 | 3/2018 | Jacob et al. | |
| 2007/0181224 A1* | 8/2007 | Marya | ................... C09K 8/805 148/400 |
| 2008/0249638 A1* | 10/2008 | Asgari | ...................... A61F 2/28 623/23.75 |
| 2014/0018489 A1* | 1/2014 | Johnson | ................... C08K 3/08 524/440 |
| 2016/0237530 A1 | 8/2016 | Roy et al. | |
| 2016/0251930 A1 | 9/2016 | Jacob et al. | |
| 2017/0107419 A1 | 4/2017 | Roy et al. | |
| 2017/0113275 A1 | 4/2017 | Roy et al. | |
| 2017/0174981 A1 | 6/2017 | Roy et al. | |
| 2017/0266729 A1 | 9/2017 | Roy et al. | |
| 2017/0314102 A1 | 11/2017 | Roy et al. | |
| 2017/0314103 A1 | 11/2017 | Roy et al. | |
| 2017/0355016 A1 | 12/2017 | Roy et al. | |
| 2018/0265682 A1 | 9/2018 | Roy et al. | |
| 2018/0283129 A1 | 10/2018 | Roy | |

FOREIGN PATENT DOCUMENTS

WO    WO2016085804 A1    6/2016

\* cited by examiner

*Primary Examiner* — Josephine L Chang
(74) *Attorney, Agent, or Firm* — Kelly McKinney

(57) ABSTRACT

A component can include a degradable polymeric material that includes a thermoplastic elastomeric matrix and alloy particles disposed at least in part within the matrix where the alloy particles include aluminum and one or more metals selected from a group of alkali metals, alkaline earth metals, group 12 transition metals, and basic metals having an atomic number equal to or greater than 31.

18 Claims, 18 Drawing Sheets

DEGRADABLE POLYMERIC MATERIAL

BACKGROUND

Various types of materials are used in equipment, operations, etc. for exploration, development and production of resources from geologic environments. For example, equipment may be used in one or more of a sensing operation, a drilling operation, a cementing operation, a fracturing operation, a production operation, etc.

SUMMARY

A component can include a degradable polymeric material that includes a thermoplastic elastomeric matrix and alloy particles disposed at least in part within the matrix where the alloy particles include aluminum and one or more metals selected from a group of alkali metals, alkaline earth metals, group 12 transition metals, and basic metals having an atomic number equal to or greater than 31. A method can include forming a degradable polymeric material where the forming includes compounding a composite of a thermoplastic elastomeric material that includes alloy particles that include aluminum and one or more metals selected from a group of alkali metals, alkaline earth metals, group 12 transition metals, and basic metals having an atomic number equal to or greater than 31. A bore tool can include a degradable polymeric material that includes a thermoplastic elastomeric matrix and alloy particles disposed at least in part within the matrix where the alloy particles include aluminum and gallium. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
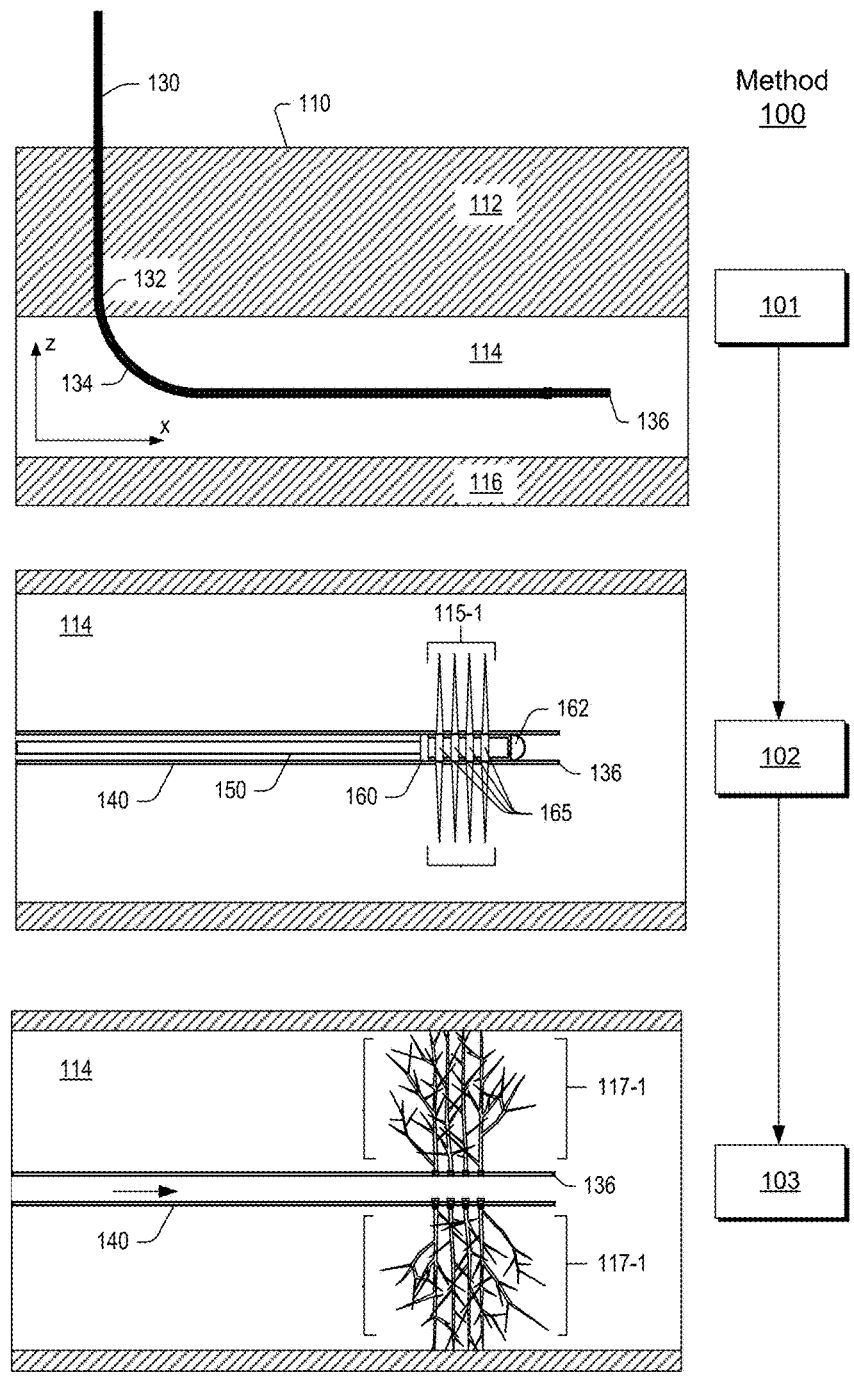
FIGS. 1 and 2 illustrate an example of a method and examples of equipment for fracturing a geologic environment.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As an example, a material or materials may be processed to form processed material. In such an example, the processed material may be compressed, machined, formed, etc. to produce a part or parts. As an example, a part may be a component or a portion of a component. A part may be included in equipment, which may be suitable for use in an environment such as, for example, a downhole environment. As an example, equipment may be drilling equipment, cementing equipment, fracturing equipment, sampling equipment, or other type of equipment. As an example, equipment may be borehole equipment. As an example, a tool may be a borehole tool, for example, suitable to perform a function or functions in a downhole environment in a borehole.

As to cementing equipment, such equipment may be used in one or more downhole cementing operations. As an example, cement may be placed adjacent to a liner. As an example, a liner may be a string of casing in which the top does not extend to the surface but instead is suspended from inside another casing string. As an example, a liner hanger may be used to attach or hang one or more liners from an internal wall of another casing string.

As an example, a method may include operating one or more components of a liner hanger system. As an example, a lower completion may be a portion of a well that is at least in part in a production zone or an injection zone. As an example, a liner hanger system may be implemented to perform one or more operations associated with a lower completion, for example, including setting one or more components of a lower completion, etc. As an example, a liner hanger system may anchor one or more components of a lower completion to a production casing string.

As an example, equipment may include one or more plugs, one or more seats that can receive a respective plug, etc. In such an example, it may be desirable that a plug and/or a seat have properties suited for one or more operation or operations. Properties may include mechanical properties and may include one or more other types of properties (e.g., chemical, electrical, etc.). As an example, it may be desirable that a plug and/or a seat degrade. For example, a plug and/or a seat may be manufactured with properties such that the plug and/or the seat degrade when exposed to one or more conditions. In such an example, where the plug acts to block a passage, upon degradation, the passage may become unblocked. As an example, a component (e.g., a plug, a seat, etc.) may degrade in a manner that facilitates one or more operations. As an example, a component or a portion of a component may degrade in stages. For example, consider a plug that degrades from a first size to a second smaller size. In such an example, the second smaller size may allow the plug to move (e.g., from a first seat to a second seat, etc.). As an example, a plug tool may be a degradable tool. As an example, a plug tool may be degradable in part. For example, consider a plug tool with a degradable seat or degradable seats. In such an example, a plug may be seated in a degradable seat that upon degradation of the seat, the plug may pass through the seat (e.g., become unplugged with respect to that seat). As an example, a system can include a plug tool that is degradable at least in part and can also include one or more degradable plugs (e.g., balls, cylinders, etc.).

As an example, at least a portion of a borehole tool may be broken via interaction with a tool where at least some of resulting pieces are degradable. For example, a tool may apply force (e.g., drilling force or other force) to a plug, a plug tool, etc. such that the applied forces causes breaking into pieces of at least a portion of the plug, at least a portion of the plug tool, etc. In such an example, the pieces may be relatively large and degrade to relatively small pieces (e.g., which may pass through one or more openings, etc.).

As an example, a component may be formed at least in part from a plastic. For example, consider a thermoplastic elastomer (TPE) that includes multi-block copolymers that include so-called hard segments (e.g., microcrystalline phase segments) and so-called soft segments (e.g., amorphous phase segments) that form a polymer network.

As to a crystalline phase, it can be characterized by formation of physical crosslinking that can provide some amount of elasticity at temperatures below a melting point of the crystalline phase. As physical crosslinking can be thermoreversible, a polymeric material may be processed using, for example, one or more types of melt-process facilities (e.g., injection molding, extrusion, compression molding, bulk molding compound (BMC), sheet molding compound (SMC), etc.).

As an example, a multi-block polymer (e.g., a TPE, etc.) may be processed with one or more other types of materials. For example, consider one or more other types of rubbers, thermoplastics, and/or fillers, which may be utilized to form one or more types of polymer blends and/or polymer composites.

As to natural rubbers, they include predominantly carbon-carbon bonds; whereas, for example, a TPE can include ester, amide and/or urethane bonds along a polymer chain. Various types of bonds may be subject to hydrolysis when exposed to water. Various types of TPEs can exhibit wear resistance, resistance to cut growth and can be less likely to extrude under stress than natural rubbers.

As a TPE can include monomers that are not substantially soluble in water, degradation of TPE can refer to loss of material integrity and/or strength with or without loss of materials. For certain applications such as being a seal component (e.g., or a seal element, etc.), a TPE seal component may benefit from being able to withstand a relatively large differential pressure (e.g., about several thousands to about ten thousands psi) over a certain application time frame. In such an example, the TPE component (e.g., or the portion of the component that includes TPE) can benefit from an ability to maintain a certain modulus in an aqueous environment (e.g., prior to mechanical failure, etc.).

As an example, a degradable polymeric material may degrade via one or more degradation mechanisms. For example, consider a polymer bond degradation mechanism where water can hydrolytically attack one or more types of polymer bonds and consider an alloy degradation mechanism where water can generate hydroxides that can cause degradation of the alloy.

As an example, upon exposure of a degradable polymeric material to water, ester, amide and/or urethane bonds of a TPE may hydrolytically degrade and cause the degradable polymeric material to lose its integrity and eventually break down. As an example, alloy particles within a polymer matrix of a degradable polymeric material may act to reinforce and enhance the modulus of the degradable polymeric material (e.g., before and during the degradation). Where such alloy particles are reactive to water, their presence may accelerate degradation of the degradable polymeric material. As an example, an alloy particle may include a relatively high surface area to volume ratio and/or be quite reactive to water as in an aqueous environment and/or other type of downhole environment where water is present.

As an example, a polymeric material can include metallic particles where the metallic particles degrade when exposed to water. As an example, consider metallic particles that include an alloy that includes aluminum and gallium where, upon exposure to water, the metallic particles degrade.

Aluminum is a chemical element in the boron group with symbol Al and atomic number 13. It is a silvery-white, soft, nonmagnetic, ductile metal that may be extracted from an ore such as bauxite.

Gallium is a chemical element with symbol Ga and atomic number 31. Elemental gallium tends not to occur as a free element in nature and can be found, for example, in the form of gallium(III) compounds (e.g., in zinc ores, bauxite, etc.). Elemental gallium is a soft, silvery metal at standard temperature and pressure, a brittle solid at low temperatures, and a liquid at temperatures greater than about 30 degree C. (e.g., about 86 degrees F.). The alloy galinstan (e.g., 68.5% gallium, 21.5% indium, and 10% tin) has a lower melting point of about 19 degrees C. (e.g., about 2 degrees F.).

Where gallium is present in an alloy, it can be present at grain boundaries. For example, an alloy can include grains and grain boundaries where the amount of gallium by weight percent is greater at the grain boundaries than in the grains.

As an example, a reactive material may include an element that tends to form positive ions when its compounds are dissolved in a liquid solution and whose oxides form hydroxides rather than acids with water. As an example, a material may disintegrate. For example, consider an alloy that loses structural integrity and becomes dysfunctional for instance due to grain-boundary embrittlement or dissolution of one of its elements. As an example, a byproduct of degradation from grain boundaries may not necessarily include an ionic compound such as a hydroxide and may include a metallic powder residue (e.g., consider severely embrittled aluminum alloys of gallium and indium).

As an example, once a degradable alloy material (e.g., powder or particulate material) of a degradable polymeric material reacts with water, as it diffuses into the polymeric matrix of the degradable polymeric material, hydroxides may be formed and hydrogen gas may be formed as well, which may form "bubbles" that seek egress from the degradable polymeric material. Such processes can cause the degradable polymeric material to degrade structurally such that its integrity is compromised.

As an example, a degradable polymeric material can include one or more types of TPEs and a material that can form hydroxide upon exposure to water. As an example, a degradable polymeric material can include a TPE and a material that can form hydroxide upon exposure to water. As an example, a TPE can include one or more types of bonds that are subject to hydrolytic attack.

As an example, a method can include mixing a TPE and a water reactive alloy to form a degradable polymeric material (e.g., a composite material). As an example, one or more types of metallic particles can be compounded into molten TPE to form degradable polymeric material in one or more forms (e.g., pellets, etc.). For example, consider using a twin screw extruder to extrude a melt that includes TPE and a water reactive alloy to form composite pellets. As an example, such pellets can be suitable for injection molding, compression molding, extrusion, etc. As an example, a molding or extrusion process may be utilized to form as part of a process to form a component or components with final shape suitable for use in one or more applications.

As an example, a degradable polymeric material can include alloy particles disposed in a polymer matrix where the alloy particles increase the electrical conductivity of the polymer matrix. As to degradable particles, these can include aluminum as an alloying element in combination with one or more other elements. For example, degradable particles can include aluminum and gallium and optionally one or more other types of elements as an alloy.

As mentioned, equipment may include fracturing equipment where such equipment may be employed to generate one or more fractures in a geologic environment. As an example, a method to generate fractures can include a delivery block for delivering fluid to a subterranean environment, a monitor block for monitoring fluid pressure and a generation block for generating fractures via fluid pressure. As an example, the generation block may include activating one or more fractures. As an example, the generation block may include generating and activating fractures. As an example, activation may occur with respect to a pre-existing feature such as a fault or a fracture. As an example, a pre-existing fracture network may be at least in part activated via a method that includes applying fluid pressure in a subterranean environment. The foregoing method may be referred to as a treatment method or a "treatment". Such a method may include pumping an engineered fluid (e.g., a treatment fluid) at high pressure and rate into a reservoir via one or more bores, for example, to one or more intervals to be treated, which may cause a fracture or fractures to open (e.g., new, pre-existing, etc.).

As an example, a fracture may be defined as including "wings" that extend outwardly from a bore. Such wings may extend away from a bore in opposing directions, for example, according in part to natural stresses within a formation. As an example, proppant may be mixed with a treatment fluid to keep a fracture (or fractures) open when a treatment is complete. Hydraulic fracturing may create high-conductivity communication with an area of a formation and, for example, may bypass damage that may exist in a near-wellbore area. As an example, stimulation treatment may occur in stages. For example, after completing a first stage, data may be acquired and analyzed for planning and/or performance of a subsequent stage.

Size and orientation of a fracture, and the magnitude of the pressure to create it, may be dictated at least in part by a formation's in situ stress field. As an example, a stress field may be defined by three principal compressive stresses, which are oriented perpendicular to each other. The magnitudes and orientations of these three principal stresses may be determined by the tectonic regime in the region and by depth, pore pressure and rock properties, which determine how stress is transmitted and distributed among formations.

Where fluid pressure is monitored, a sudden drop in pressure can indicate fracture initiation of a stimulation treatment, as fluid flows into the fractured formation. As an example, to break rock in a target interval, fracture initiation pressure exceeds a sum of the minimum principal stress plus the tensile strength of the rock. To determine fracture closure pressure, a process may allow pressure to subside until it indicates that a fracture has closed. A fracture reopening pressure may be determined by pressurizing a zone until a leveling of pressure indicates the fracture has reopened. The closure and reopening pressures tend to be controlled by the minimum principal compressive stress (e.g., where induced downhole pressures exceed minimum principal stress to extend fracture length).

After performing fracture initiation, a zone may be pressurized for furthering stimulation treatment. As an example, a zone may be pressurized to a fracture propagation pressure, which is greater than a fracture closure pressure. The difference may be referred to as the net pressure, which represents a sum of frictional pressure drop and fracture-tip resistance to propagation (e.g., further propagation).

As an example, a method may include seismic monitoring during a treatment operation (e.g., to monitor fracture initiation, growth, etc.). For example, as fracturing fluid forces rock to crack and fractures to grow, small fragments of rock break, causing tiny seismic emissions, called microseisms. Equipment may be positioned in a field, in a bore, etc. to sense such emissions and to process acquired data, for example, to locate microseisms in the subsurface (e.g., to locate hypocenters). Information as to direction of fracture growth may allow for actions that can "steer" a fracture into a desired zone(s) or, for example, to halt a treatment before a fracture grows out of an intended zone. Seismic information (e.g., information associated with microseisms) may be used to plan one or more stages of fracturing operations (e.g., location, pressure, etc.).

Figure 2:
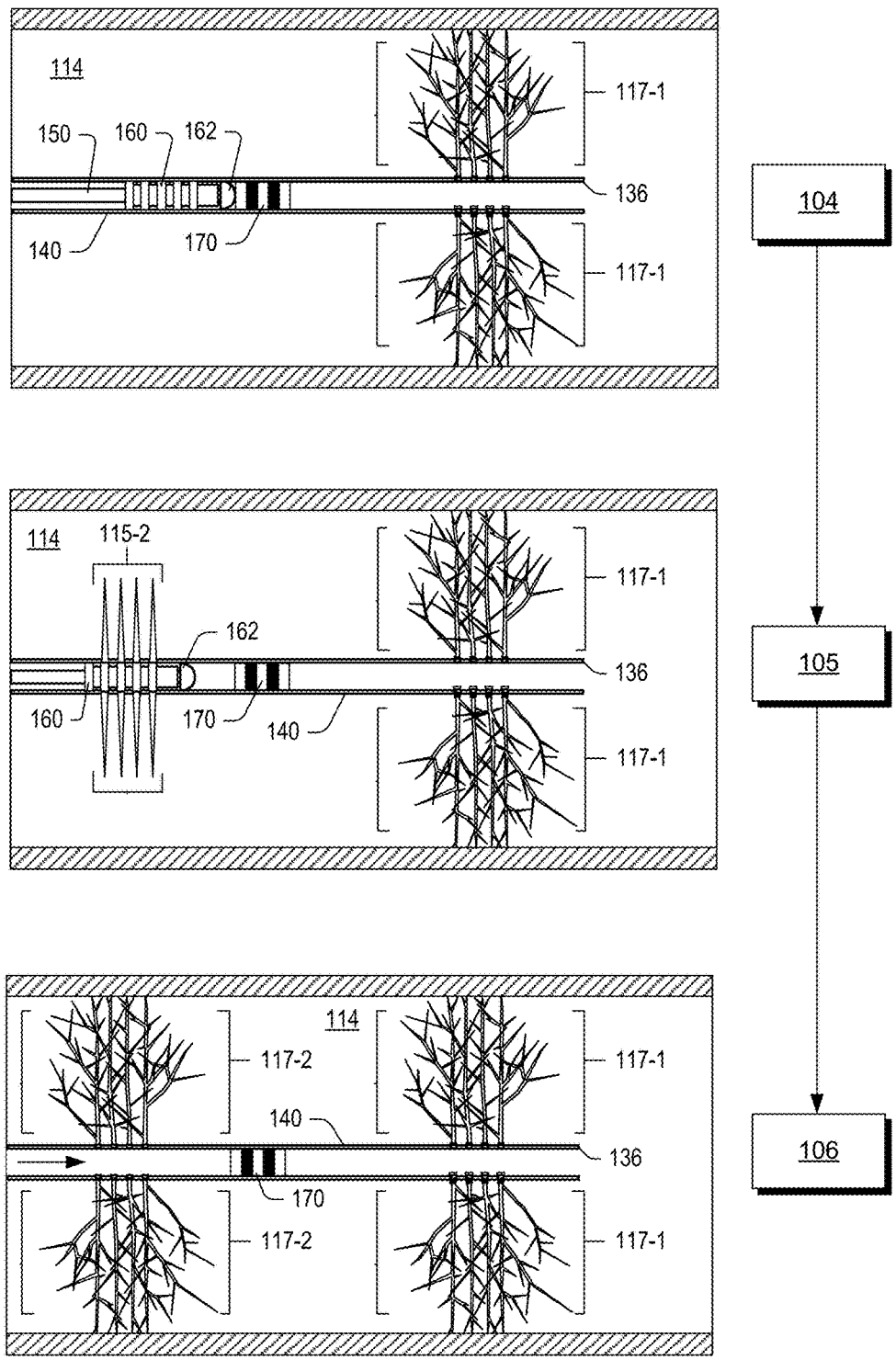

FIGS. 1 and 2 show an example of a method 100 that includes generating fractures. As shown, the method 100 can include various operational blocks such as one or more of the blocks 101, 102, 103, 104, 105 and 106. The block 101 may be a drilling block that includes drilling into a formation 110 that includes layers 112, 114 and 116 to form a bore 130 with a kickoff 132 to a portion defined by a heel 134 and a toe 136, for example, within the layer 114.

As illustrated with respect to the block 102, the bore 130 may be at least partially cased with casing 140 into which a string or line 150 may be introduced that carries a perforator 160. As shown, the perforator 160 can include a distal end 162 and charge positions 165 associated with activatable charges that can perforate the casing 140 and form channels 115-1 in the layer 114. Next, per the block 103, fluid may be introduced into the bore 130 between the heel 134 and the toe 136 where the fluid passes through the perforations in the casing 140 and into the channels 115-1. Where such fluid is under pressure, the pressure may be sufficient to fracture the layer 114, for example, to form fractures 117-1. In the block 103, the fractures 117-1 may be first stage fractures, for example, of a multistage fracturing operation.

Per the block 104, additional operations are performed for further fracturing of the layer 114. For example, a plug 170 may be introduced into the bore 130 between the heel 134 and the toe 136 and positioned, for example, in a region between first stage perforations of the casing 140 and the heel 134. Per the block 105, the perforator 160 may be activated to form additional perforations in the casing 140 (e.g., second stage perforations) as well as channels 115-2 in the layer 114 (e.g., second stage channels). Per the block 106, fluid may be introduced while the plug 170 is disposed in the bore 130, for example, to isolate a portion of the bore 130 such that fluid pressure may build to a level sufficient to form fractures 117-2 in the layer 114 (e.g., second stage fractures).

In a method such as the method 100 of FIGS. 1 and 2, it may be desirable that a plug (e.g., the plug 170) includes properties suited to one or more operations. Properties of a plug may include mechanical properties (e.g., sufficient strength to withstand pressure associated with fracture generation, etc.) and may include one or more other types of properties (e.g., chemical, electrical, etc.). As an example, it may be desirable that a plug degrades, that a plug seat degrades, that at least a portion of a borehole tool degrades, etc. For example, a plug may be manufactured with properties such that the plug withstands, for a period of time, conditions associated with an operation and then degrades (e.g., when exposed to one or more conditions). In such an example, where the plug acts to block a passage for an operation, upon degradation, the passage may become unblocked, which may allow for one or more subsequent operations.

As an example, a component may be degradable upon contact with a fluid such as an aqueous ionic fluid (e.g., saline fluid, etc.). As an example, a component may be degradable upon contact with well fluid that includes water (e.g., consider well fluid that includes oil and water, etc.). As an example, a component may be degradable upon contact with a fracturing fluid (e.g., a hydraulic fracturing fluid). As an example, a degradation time may depend on a component dimension or dimensions and can differ for various temperatures where a component is in contact with a fluid that is at least in part aqueous (e.g., include water as a medium, a solvent, a phase, etc.).

Figure 3:
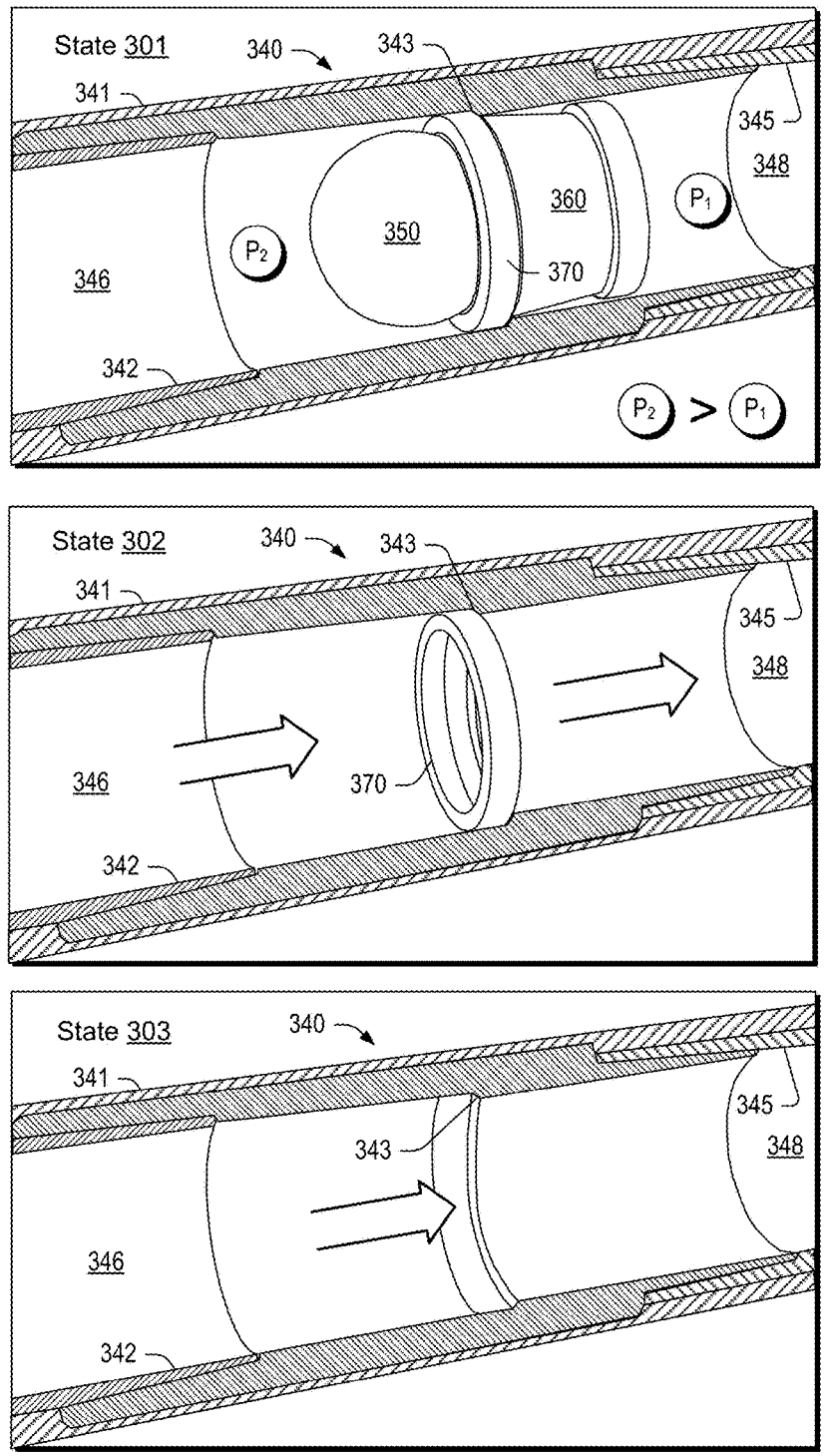
FIG. 3 illustrates an example of equipment in various example operational states.

FIG. 3 shows an example of equipment in various states 301, 302 and 303. As shown, the equipment can include a casing 340 that include various components 341, 342, 343 and 345. For example, the component 342 may define a bore 346 and the component 345 may define a bore 348 where the component 343 includes features (e.g., reduced diameter, conical shape, receptacle, etc.) that can catch a ring component 370 that is operatively coupled to a plug component 360 where the ring component 370 and the plug component 360 may position and seat a plug 350 in the casing 340. As an example, a seal may be formed by the plug 350 with respect to the plug component 360 and/or the ring component 370 and, for example, a seal may be formed by the ring component 370 with respect to the component 343. In such an approach, the seals may be formed in part via fluid pressure in a manner where increased pressure acts to increase seal integrity (e.g., reduce clearances that may be subject to leakage). As an example, the ring component 370 may be an upper component (e.g., a proximal component) of a plug seat and the plug component 360 may be a lower component (e.g., a distal component) of the plug seat.

As shown in the state 301, the plug 350 may be seated such that the bore 346 (e.g., of a first zone) is separated (e.g., isolated) from the bore 348 (e.g., of a second zone) such that fluid pressure in the bore 346 (see, e.g., $P_2$) may be increased to a level beyond fluid pressure in the bore 348 (see, e.g., $P_1$). Where the plug 350 and the plug component 360 are degradable, for example, upon contact with fluid that may pressurize the bore 348, degradation of the plug 350 and the plug component 360 may transition the equipment from the state 301 to the state 302. As shown in the state 302, fluid may pass from the bore 346 to the bore 348, for example, via an opening of the ring component 370. Where the ring component 370 is degradable, for example, upon contact with fluid in the bore 346, degradation of the ring component 370 may transition the equipment from the state 302 to the state 303. In the state 303, the casing 340 may be the remaining equipment of the state 301 (e.g., the plug 350, the plug component 360 and the ring component 370 are at least in part degraded).

As an example, the plug 350, the plug component 360 and the ring component 370 may be components of a dissolvable plug and perforation system that may be used to isolate zones during stimulation (see, e.g., the method 100 of FIGS. 1 and 2). Such equipment may be implemented in, for example, cemented, uncemented, vertical, deviated, or horizontal bores (e.g., in shale, sandstone, dolomite, etc.).

As an example, the plug component 360 and the ring component 370 may be conveyed in a bore via a pump down operation (e.g., which may move the components 360 and 370 along a bore axis direction). As an example, a component or components may include adjustable features, for example, that allow a change in diameter to facilitate seating in a receptacle disposed in a bore. For example, a tool may interact with a component or components to cause a change in diameter or diameters (e.g., a change in form of one or more components). In the changed state, the component or components may catch and seat in a receptacle disposed in a bore (e.g., seat in a shoulder of a receptacle component).

As an example, the plug component 360 and the ring component 370 may be seated in a receptacle by a tool that may include one or more perforators. Once seated, the tool may be repositioned to perforate casing and form channels (e.g., in a layer or layers of rock). As an example, repositioning may occur multiple times, for example, to form multiple sets of perforations and multiple sets of channels. As an example, after perforating and channel formation, the plug 350 may be pumped down to contact the plug component 360 and/or the ring component 370, for example, to form a seal that can isolate one zone from another zone (e.g., one interval from another interval). Fluid pressure may be increased in an isolated zone as defined by the plug 350, the plug component 360 and the ring component 370 as positioned in a receptacle disposed in a bore such that the fluid enters channels via perforations of the isolated zone and generates fractures (e.g., new fractures, reactivated fractures, etc.).

In the example method 100 shown in FIGS. 1 and 2, one or more degradable polymeric materials may be employed. For example, consider one or more of the plug 350, the plug component 360 and the ring component 370 as including a degradable polymeric material. In such an example, the ring component 370 may include a degradable polymeric material coating that can enhance sealing with respect to one or more other components. As an example, the plug component 360 may be made of a plurality of parts where one or more interfaces between two or more of the parts may include a degradable polymeric material.

As an example, a degradable polymeric material may be configured as an O-ring or other type of seal ring or seal element. As an example, a degradable O-ring may degrade in a manner that allows for disruption of a seal such that fluid can penetrate a component, adjoining parts, etc. Where such a component, adjoining parts, etc., are degradable, intrusion of fluid (e.g., well fluid, hydraulic fracturing fluid, water, etc.) may causes degradation thereof.

As an example, equipment associated with one or more types of downhole operations can include one or more types of degradable polymeric materials. As mentioned, a liner may be a casing (e.g., a completion component). As mentioned, a liner may be installed via a liner hanger system. As an example, a liner hanger system may include various features such as, for example, one or more of the features of an assembly 450 of FIG. 4.

Figure 4:
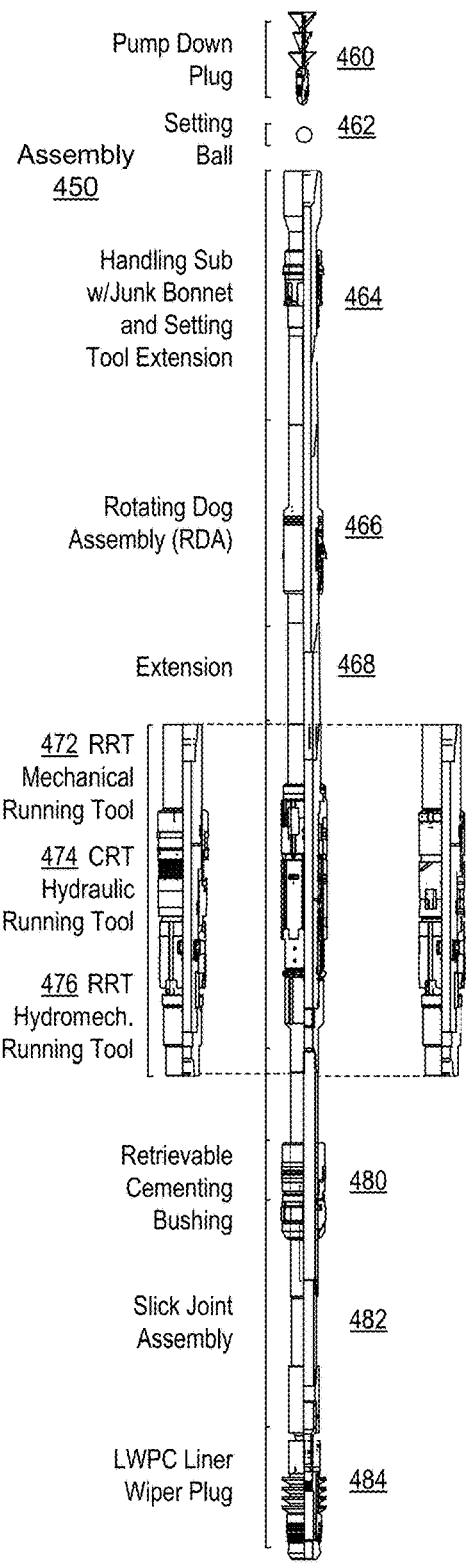
FIG. 4 illustrates examples of equipment.

As shown in FIG. 4, the assembly 450 can include a pump down plug 460, a setting ball 462, a handling sub with a junk bonnet and setting tool extension 464, a rotating dog assembly (RDA) 466, an extension(s) 468, a mechanical running tool 472, a hydraulic running tool 474, a hydromechanical running tool 476, a retrievable cementing bushing 480, a slick joint assembly 482 and/or a liner wiper plug 484.

As an example, a plug may be an object that can be seated, for example, to seal an opening. As an example, the pump down plug 460 and the setting ball 462 may be plugs. As an example, a plug tool may be a tool that includes at least one seat to seat a plug. For example, a plug tool may include a seat that can seat a plug shaped as a ball (e.g., a spherical plug), as a cylinder (e.g., a cylindrical plug), or other shaped plug.

As an example, an assembly may include a liner top packer with a polished bore receptacle (PBR), a coupling(s), a mechanical liner hanger, a hydraulic liner hanger, a hydraulic liner hanger, a liner(s), a landing collar with a ball seat, a landing collar without a ball seat, a float collar, a liner joint or joints and/or a float shoe and/or a reamer float shoe.

As an example, a method can include a liner hanger setting procedure. Such a procedure may include positioning a liner shoe at a depth at which a hanger is to be set, dropping a setting ball from a ball dropping sub of a cementing manifold, gravitating or pumping the ball down to a ball catch landing collar, reducing the pump rate when the ball is expected to seat, increasing pressure, which pressure may act through setting ports of a hanger body and set slips on to a casing, and while holding the hanger setting pressure, setting the liner hanger by slacking off the liner weight on the hanger slips, where a loss of weight may be indicated on a weight gauge as the liner hanger sets.

In the foregoing example, it may be desirable that the ball (see, e.g., the ball 462) has properties suited for one or more operation or operations. Properties may include mechanical properties and may include one or more other types of properties (e.g., chemical, electrical, etc.). As an example, it may be desirable that the ball degrades. For example, a ball may be manufactured with properties such that the ball degrades when exposed to one or more conditions (e.g., consider environmentally-assisted cracking). In such an example, where the ball acts to block a passage, upon degradation, the passage may become unblocked. As an example, a ball or other component (e.g., a plug, etc.) may degrade in a manner that facilitates one or more operations.

As an example, one or more seals may be made at least in part of a degradable polymeric material. For example, consider a seat that may be coated with a degradable polymeric material that can, prior to degradation, facilitate sealing of a plug that can be seated in the seat. As an example, a plug may be coated with a degradable polymeric material. As an example, a plug may be coated with a degradable polymeric material and a seat that can seat the plug may be coated with a degradable polymeric material.

As an example, a component or a portion of a component may degrade in stages. For example, consider a plug that degrades from a first size to a second smaller size. In such an example, the second smaller size may allow the plug to move (e.g., from a first seat to a second seat, etc.). As an example, a plug tool may be a degradable tool. As an example, a plug tool may be degradable in part (e.g., consider a frangible degradable plug). For example, consider a plug tool with a degradable seat or degradable seats. In such an example, a plug may be seated in a degradable seat that upon degradation of the seat, the plug may pass through the seat (e.g., become unplugged with respect to that seat). As an example, a system can include a plug tool that is degradable at least in part and one or more degradable plugs (e.g., balls, cylinders, etc.). As an example, a layer of a plug, a seat, etc., may be a degradable polymeric material layer.

As an example, a connector that connects two or more parts may be made of a degradable polymeric material. For example, consider a joint that joins two parts in a fixed or a movable relationship with respect to each other. In such an example, the joint may degrade and thereby free the parts where the parts may or may not be made of degradable material. As an example, a structure may be made of joints and connecting rods where degradation of the joints frees the connecting rods, which may be themselves degradable or not. As an example, such rods may be small in transverse cross-section when compared to a transverse cross-section of a tool, a casing, a tubing, etc. As an example, rods can be spring-like such that a structure of the rods and joints may flex and/or exert a biasing force. Such a structure may be utilized for one or more operations and then degrade upon exposure to water (e.g., as in a downhole environment, etc.).

Figure 5:
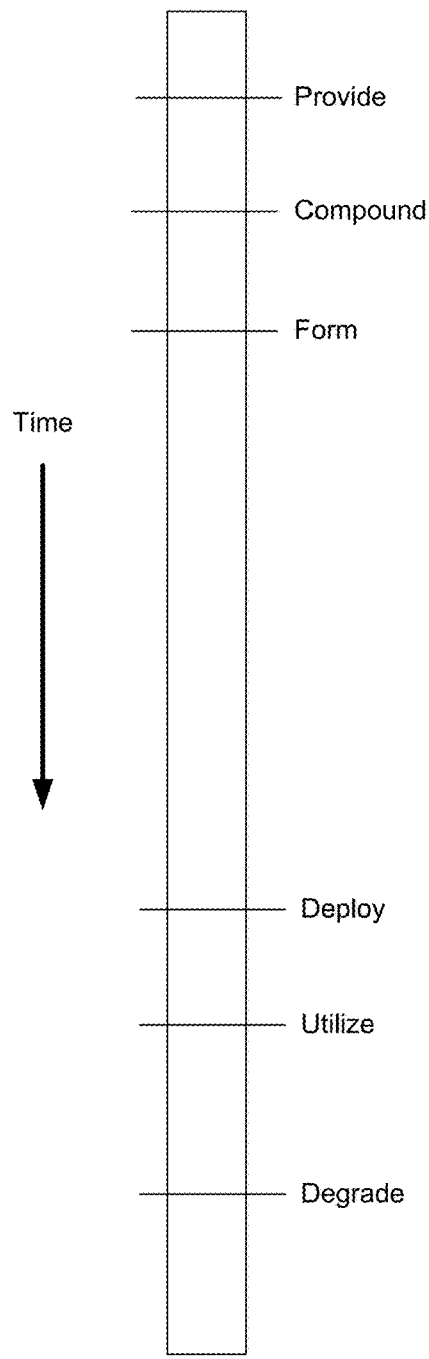
FIG. 5 illustrates an example of a life cycle.

FIG. 5 shows an example of a life cycle 510. In the life cycle 510, various times are illustrated as to stages or phases. For example, materials may be provided, compounded, and formed via one or more processes. As an example, a finished component may be deployed, utilized and then degraded.

As an example, a polymer compound can include polymer blends, copolymers and thermoplastic elastomers (TPE). As to polymer blends, these can include combinations of different polymers that may be mixed in a molten state. Upon solidification, the different polymers can combine physically, for example, without chemical reaction. As to copolymers, these types of polymers can include at least two different types of monomer units. As to thermoplastic elastomers (TPE), they can include some amount of elastic polymeric characteristic. As an example, a TPE may be processed to form one or more types of components via extrusion, molding, etc. As an example, a TPE-based component may be joined to another component via, for example, one or more of adhesive bonding, solvent bonding, welding, coextrusion, multicomponent injection molding, etc.

As an example, a TPE blend can include a thermoplastic portion (e.g., polypropylene, polyester, etc.) and a softer portion (e.g., particles of Ethylene-Propylene-Diene-Monomer rubber (EPDM)), which may be dispersed. As an example, TPEs may be classified into one or more classes (e.g., TPE-A, TPE-E, TPE-U, TPE-O, TPE-V and TPE-S).

As an example, a polymer composite can include a polymeric material that can form a matrix and additional material that may be considered to be a filler. For example, particles such as mineral powder, wood our or carbon black may be used to increase stiffness of a polymeric matrix material.

As an example, a degradable polymeric material can be a polymeric composite material (e.g., a composite) that includes a polymeric matrix and particles, which can be, for example, alloy particles that include metals. For example, consider alloy particles that include aluminum and gallium. Such particles may be considered to be a dispersed phase in a polymeric matrix.

As an example, a polymeric material such as a degradable polymeric material may be characterized by one or more temperatures. For example, consider a glass transition temperature (Tg). Below a glass temperature (Tg), mobility of molecules can be curbed via intermolecular interaction. At the glass temperature (Tg), micromobility of chain segments and side chains can occur where a polymeric material can be softer yet may still be somewhat mechanically stable. At a higher temperature such as a flow temperature (Tf), the hindering in uence of intermolecular interaction can decrease and macromolecular chains may slip against each other. A higher temperature may be the crystallite melting temperature (Tm), where a polymeric material may be considered to be molten (e.g., a molten state) and, where thermal decomposition does not occur or appreciably occur, the polymeric material can be reversibly transitioned to a solidified state, for example, via cooling. Upon such cooling, crystallite phases can form, which may, depending on conditions, differ in size, distribution, etc., from a prior solid state.

As an example, a degradable polymeric material may be degradable as to its structural properties at a temperature that may be less than a crystallite melting temperature (Tm) and/or that may be less than a flow temperature (Tf). In such an example, the degradable polymeric material can include a thermoplastic elastomeric matrix and alloy particles. For example, consider alloy particles disposed at least in part within the matrix where the alloy particles can include aluminum and one or more metals selected from a group of alkali metals, alkaline earth metals, group 12 transition metals, and basic metals having an atomic number equal to or greater than 31.

As an example, a thermoplastic elastomeric material can be a HYTRL® thermoplastic elastomeric material (E.I. du Pont de Nemours and Company, Wilmington, Del.). As an example, consider HYTREL® 7246, which has a glass transition temperature (Tg) of about 25 degrees C. and a melting temperature (Tm) of about 218 degrees C. (e.g., about 424 degrees F.). As another example, consider HYTREL® 8238, which has a glass transition temperature (Tg) of about 50 degrees C. and a melting temperature (Tm) of about 221 degrees C. (e.g., about 430 degrees F.).

Another temperature is the thermal decomposition temperature (Td), where by exceeding the decomposition temperature in the molten phase of thermoplastics and thermoplastic elastomers, macromolecules can decompose (e.g., via intensive thermal oscillations). Such decomposition can involve separation of monomer units, oxidation or chemical conversion into reaction products, etc., where the material is irreversibly chemically modied.

As an example, a thermoplastic material and/or a thermoplastic elastomeric material can be processed via some amount of heating. In such an example, where the thermoplastic material and/or the thermoplastic elastomeric material predominant (e.g., with respect to polymeric material), such heating may be utilized to form a shape or shapes where upon cooling the shape or shapes become structural solids (e.g., pellets, components, etc.). Further, such structural solids may be re-processed to a molten state, for example, for reshaping (e.g., consider extrusion of pellets to form components).

As an example, a process can be referred to as compounding where the process includes a molten state being transitioned to a solid state. As an example, compounding can include reactive compounding where, for example, there may be some types of chemical reactions during a melt compounding process (e.g., possibly include crosslinking). As an example, solidifying can refer to a process where a lowering of temperature occurs such that a solid phase forms, noting that for reactive compounding, completion of chemical reactions may correspond to a lowering of temperature.

As an example, an environment in which one or more components may be deployed may be a harsh environment, for example, an environment that may be classified as being a high-pressure and high-temperature environment (HPHT). A so-called HPHT environment may include pressures up to about 138 MPa (e.g., about 20,000 psi) and temperatures up to about 205 degrees C. (e.g., about 400 degrees F. and about 480 K), a so-called ultra-HPHT environment may include pressures up to about 241 MPa (e.g., about 35,000 psi) and temperatures up to about 260 degrees C. (e.g., about 500 degrees F. and about 530 K) and a so-called HPHT-hc environment may include pressures greater than about 241 MPa (e.g., about 35,000 psi) and temperatures greater than about 260 degrees C. (e.g., about 500 degrees F. and about 530 K). As an example, an environment may be classified based in one of the aforementioned classes based on pressure or temperature alone. As an example, an environment may have its pressure and/or temperature elevated, for example, through use of equipment, techniques, etc. For example, a SAGD operation may elevate temperature of an environment (e.g., by 100 degrees C. or more; about 370 K or more).

A material may be characterized by one or more properties. For example, a material may be characterized at least in part by flexural modulus or bending modulus, which is the ratio of stress to strain in flexural deformation (e.g., tendency for a material to bend). The flexural modulus may be determined from the slope of a stress-strain curve produced by a flexural test (e.g., ASTM D 790) and may be specified in terms of units of force per area. As an example, the flexural modulus of a plastic may be approximately the same as the elastic modulus of the plastic.

As to storage or elastic modulus (E') and loss or viscous modulus (E") in viscoelastic material, these are measures of an ability of material to store energy (e.g., an elastic portion) and an ability of material to dissipate energy (e.g., a viscous portion where energy may be lost as heat).

As an example, a polymeric material can be a thermoplastic polyester where, for example, polyether-ester block copolymers combine to provide a desired amount of flexibility or stiffness. As an example, consider one or more of the HYTREL® thermoplastic polyester elastomers (TPEs) as listed in Table 1 (E.I. du Pont de Nemours and Company, Wilmington, Del.).

TABLE 1

Some Examples of HYTREL ® Polymers

| | HYTREL ® | | | |
|---|---|---|---|---|
| Temp (C.) | G4074 Flex Mod. (MPa) | G4774 Flex Mod. (MPa) | 7246 Flex Mod. (MPa) | 8238 Flex Mod. (MPa) |
| −40 | 200 | 260 | 2350 | 2600 |
| 23 | 65 | 117 | 550 | 1116 |
| 100 | 30 | 60 | 200 | 260 |

As shown, at temperatures of about 100 degrees C., for the examples of Table 1, a range exists from about 30 MPa to about 260 MPa. The HYTREL® 7246 polymer is a relatively high modulus resin that is suitable for extrusion and that exhibits resistance to oils, fuels and solvents. Such a material may be suitable for use in tubing, wire and cable jackets, gears, sprockets, oil field parts, etc.

Figure 6:
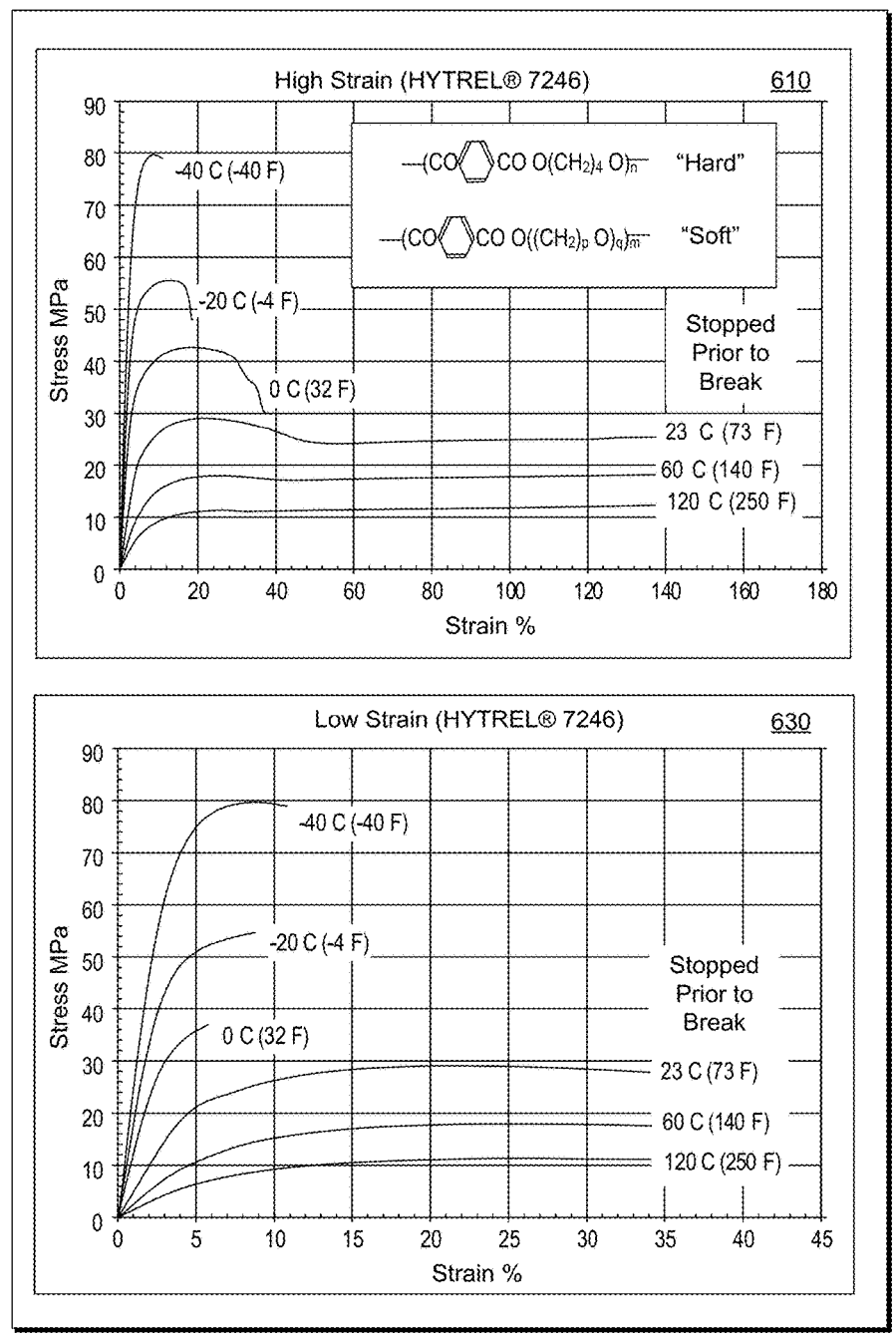
FIG. 6 illustrates example plots.

FIG. 6 shows example plots 610 and 630 for HYTREL® 7246 polymer where the plot 610 shows approximate chemical representations of a hard portion and a soft portion of a HYTREL® polymer (e.g., a block copolymer of a hard-segment (polybutylene terephthalate, PBT) and a soft-segment (polyether)). In such an example, the hard portion or hard segment can be a more crystalline portion whereas the soft portion or soft segment can be a more amorphous portion. A hard portion can be of a high melting point;

whereas, the soft portion may be of a low glass transition temperature (Tg). A hard portion may impart processability, resistance (e.g., chemical resistance to oil, etc.) and mechanical strength; whereas, a soft portion may impart flexibility, impact resistance and low temperature properties.

As shown in FIG. 6, the example plots 610 and 630 show stress-strain curves as to the relationship of an increasing force on a sample to resulting elongation of the sample. As the HYTREL® 7246 polymer has some elastomeric character, elongation prior to break tends to be relatively high; as such, the plot 610 is a high-strain level curve while the plot 630 is a low-level strain curve. The tensile strength can be characterized by the maximum stress on a curve, which can correspond to a breaking point; noting that for some harder grades, the maximum stress may be at a yield point. Stiffer grades of HYTREL® polymers show higher tensile strength and lower elongation than softer grades where the stiffer grades are higher in crystalline polyester hard segment, which results in behavior akin to various engineering plastics.

As an example, an aluminum alloy powders can be compounded into a thermoplastic polyester material (e.g., HYTREL® 7246) at a temperature of about 220 degrees C. to about 225 degrees C. to form a composite material. For example, consider one composite material with about 5 percent by weight of the aluminum alloy and another composite material with about 15 percent by weight of the aluminum alloy.

As an example, a thermogravimetric analysis or thermal gravimetric analysis (TGA) can be utilized to characterize materials. TGA can be a thermal analysis in which changes in physical and chemical properties of materials can be measured as a function of increasing temperature (e.g., optionally with a constant heating rate) and/or as a function of time (e.g., optionally with constant temperature and/or constant mass loss). As an example, TGA can provide information about physical phenomena, such as second-order phase transitions, including vaporization, sublimation, absorption, adsorption, and desorption. As an example, TGA can provide information about chemical phenomena including chemisorptions, desolvation, decomposition, and solid-gas reactions (e.g., oxidation or reduction). As an example, TGA may be used to determine selected characteristics of one or more materials that, for example, exhibit mass loss or mass gain due to one or more phenomena (e.g., decomposition, oxidation, loss of volatiles, etc.).

Figure 7:
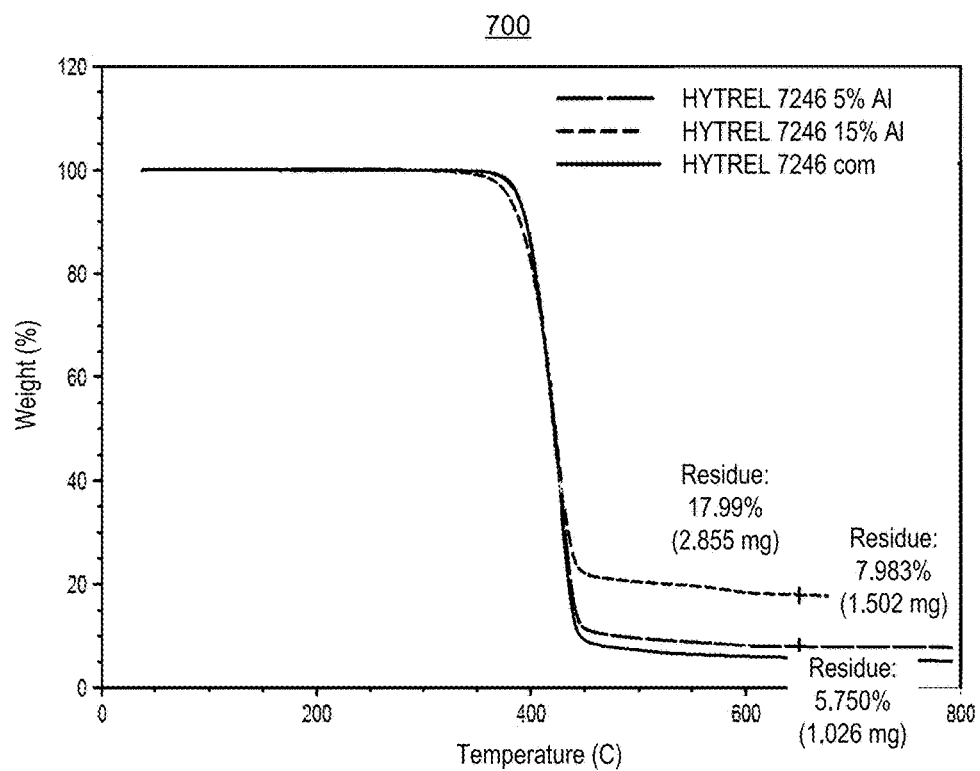
FIG. 7 illustrates an example plot.

FIG. 7 shows an example plot 700 that shows TGA spectra for the two aforementioned composite materials and for the thermoplastic polyester material without the aluminum alloy. The data in the plot 700 show that thermal stability of each of the composite materials is comparable to that of the thermoplastic polyester material without the aluminum alloy.

As an example, a material can be characterized at least in part via differential scanning calorimetry (DSC), which is a thermoanalytical technique where differences in amounts of heat energy to increase temperature of a sample and a reference can be measured as a function of temperature.

Figure 8:
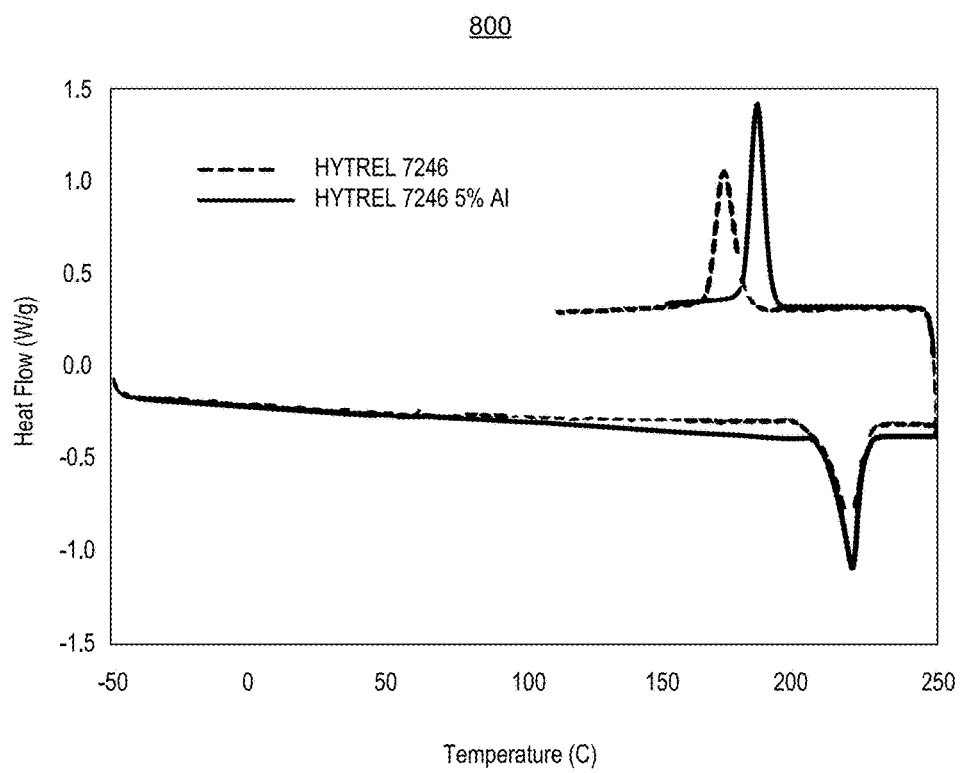
FIG. 8 illustrates an example plot.

FIG. 8 shows an example plot 800 of DSC information for one of the aforementioned composite materials and for the thermoplastic polyester material. Specifically, results for the composite material that includes about 5 percent of the aluminum alloy are shown in the plot 800. Data of the plot 800 indicate that presence of the aluminum alloy in the thermoplastic polyester material of the composite material results in increasing of crystallinity.

As an example, dynamic mechanical analysis (DMA or dynamic mechanical spectroscopy (DMS)) can be used to characterize, at least in part, a material. As an example, DMA may be utilized to characterize one or more aspects of viscoelastic behavior of polymers or polymeric materials. As an example, a sinusoidal stress can be applied to a material and strain in the material can be measured, for example, to allow for determination of the complex modulus. As an example, temperature of a sample and/or frequency of stress may be varied, for example, to uncover variations in the complex modulus. As an example, such an approach may be used to help identify a glass transition temperature of a material. As an example, such an approach may help to identify one or more transitions corresponding to one or more types of molecular motions.

Figure 9:
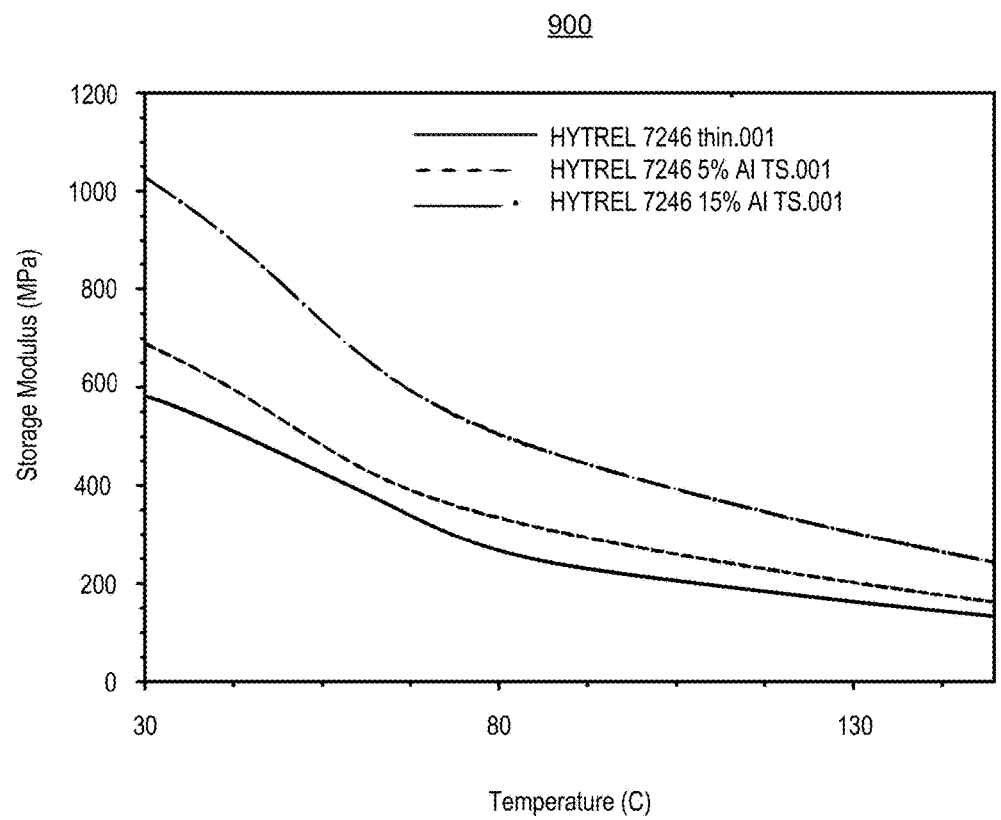
FIG. 9 illustrates an example plot.

FIG. 9 shows an example plot 900 that includes DMA temperature sweep results for three materials. The data of the plot 900 indicate that the presence of aluminum alloy in the thermoplastic polyester material results in an increase in the storage modulus of the thermoplastic polyester material where higher loadings of the composite material correlate to higher storage modulus over a relatively broad temperature range from about 30 degrees C. to about 150 degrees C.

As an example, attenuated total reflection (ATR) and/or Fourier transform infrared spectroscopy (FTIR) may be utilized to at least in part characterize a material. ATR is a sampling technique that may be used in conjunction with infrared spectroscopy (e.g., FTIR), for example, to allow for a sample to be examined directly in a solid state and/or a liquid state.

Figure 10:
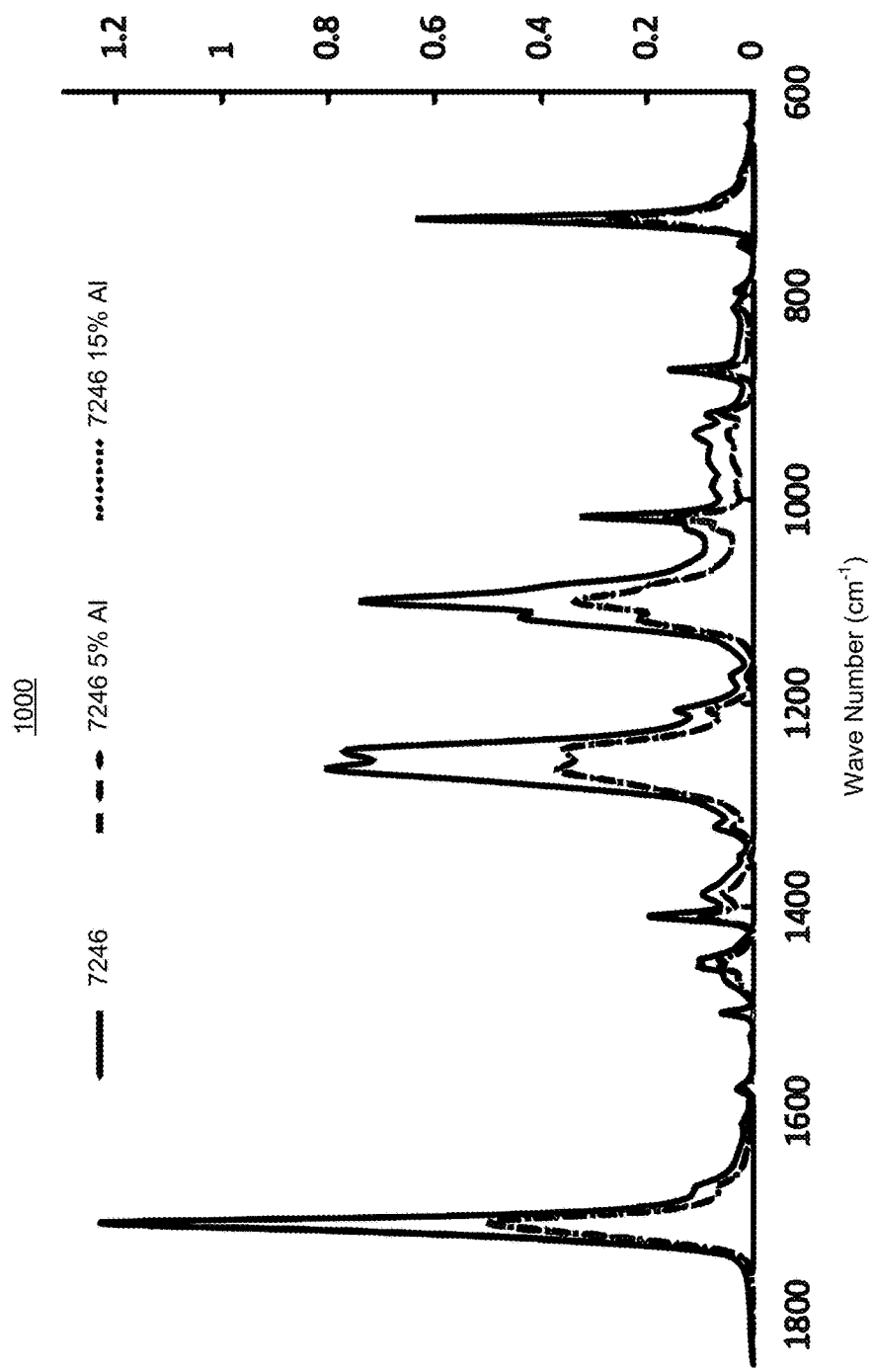
FIG. 10 illustrates an example plot.

FIG. 10 shows an example plot 1000 of ATR-FTIR of the aforementioned composite material and the thermoplastic polyester material. Specifically, the plot 1000 shows three spectra that exhibit similarities, which tends to indicate that the aluminum alloy (e.g., at the weight percentages of the composite materials) in the thermoplastic polyester material did not substantially interrupt structure or morphology of the thermoplastic polyester material (e.g., as measured without the aluminum alloy).

As an example, a method can include compounding water reactive alloy particles and a thermoplastic material, which may be initially provided in pellet form, to form pellets of a composite material. In such an example, the method can include forming a melt and extruding the melt to a desired shape or shapes of composite material, which may be in pellet form.

As an example, a material may be characterized at least in part via degradation of at least a portion of the material. For example, consider exposing a material to water, which may be deionized or ionized.

As an example, degradation of materials was examined where a method included exposing the materials to deionized (DI) water at various temperatures (e.g., about 120 degrees C. and about 150 degrees C.) for a period of approximately two days.

Figure 11:
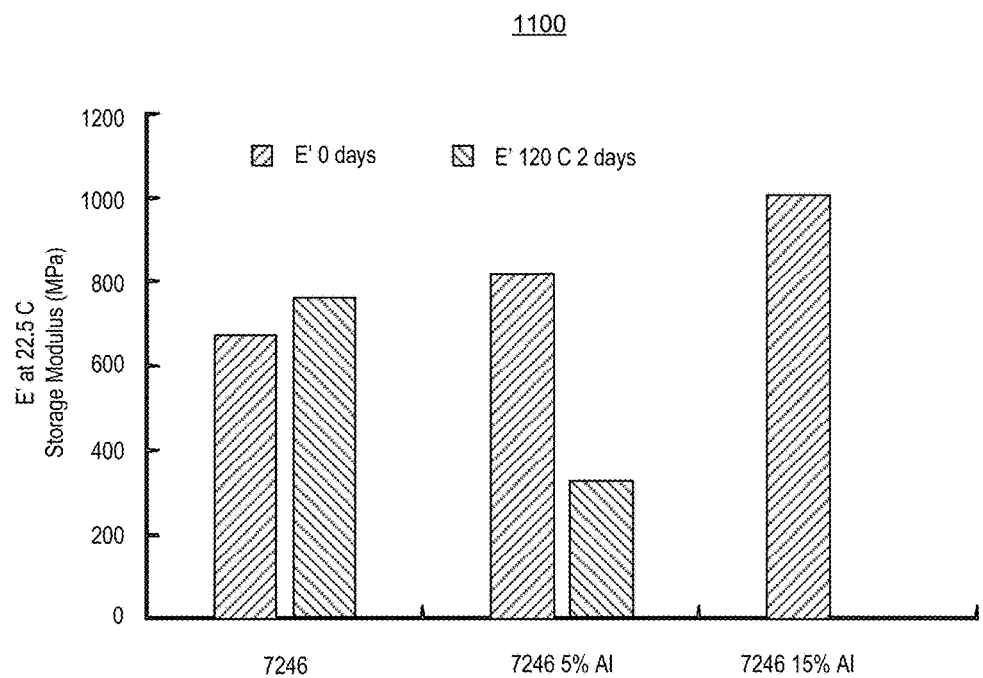
FIG. 11 illustrates an example plot.

FIG. 11 shows an example plot 1100 that corresponds to results of a method that included exposing materials to water at a temperature of about 120 degrees C. for about two days. Specifically, the plot 1100 shows the storage modulus as measured at a temperature of about 22.5 degrees C. with respect to an initial time and an approximately two day time at about 120 degrees C. for three materials, where two of the materials are composite materials that include a water reactive alloy and a thermoplastic polyester material and where the third of the materials is the thermoplastic polyester material without the water reactive alloy.

Per the data of the plot 1100, for the materials degraded at about 120 degrees C., the storage modulus of the thermoplastic polyester material is more than about 800 MPa while the storage moduli of the composite materials is around 320 MPa.

Data and observations for the composite material with about 15 percent by weight of the water reactive alloy demonstrated that exposure to water made the composite material quite brittle such that modulus could not be readily measured. For the method, the materials had strip like shapes with a length, a width and a thickness (e.g., about 2 cm by about 0.5 cm by about 0.1 cm or less, respectively). The composite material with about 15 percent by weight of the water reactive alloy demonstrated that exposure to water made the composite material so brittle that it broke into pieces upon handling by hand. In particular, degradation for exposure at about 150 degrees C. occurred more rapidly than at about 120 degrees C. and for the composite materials, after two days at temperature, the shaped composite materials were brittle and broke upon handling by hand.

Figure 12:
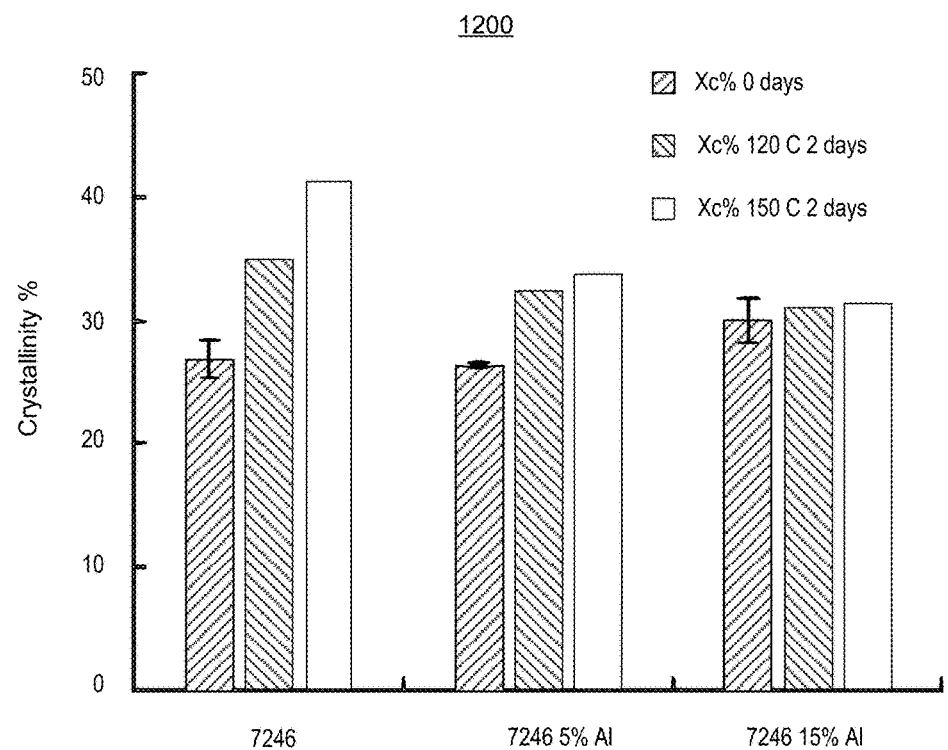
FIG. 12 illustrates an example plot.

FIG. 12 shows an example plot 1200 that is related to the materials associated with the data of the plot 1100 of FIG. 11. In FIG. 12, the plot 1200 shows crystallinity in percent for the materials as exposed to water for about 0 days, for about 2 days at about 120 degrees C. and for about 2 days at about 150 degrees C.

As shown in FIG. 12, the percent crystallinity of the thermoplastic polyester material without the water reactive alloy and the thermoplastic polyester material with about 5 percent by weight of the water reactive alloy increased after degradation at about 120 degrees C. and at about 150 degrees C. Such an increase may be due to recrystallization of PBT (polybutylene terephthalate) segments after hydrolysis of polymer chains in soft segments. As shown in FIG. 12, percent crystallinity of the composite material with about 15 percent by weight water reactive alloy exhibits relatively little change after degradation at about 120 degrees C. or at about 150 degrees C. The data of the plot 1200 indicate that the presence of the water reactive alloy in a thermoplastic polyester material can accelerates degradation of the thermoplastic polyester material upon exposure to water, for example, at a temperature of about 120 degrees C. (e.g., or less or more). As an example, a composite material may be made with an amount of water reactive alloy in a polymeric material such that a desired degradation rate upon exposure to water at one or more temperatures is achieved. For example, where faster or more degradation is desired, the weight percent of water reactive alloy may be increased in forming a composite material that includes a polymeric material (e.g., a thermoplastic material, etc.). As mentioned, such degradation may be characterized as degradation, or deterioration, of one or more mechanical properties of the composite material.

Figure 13:
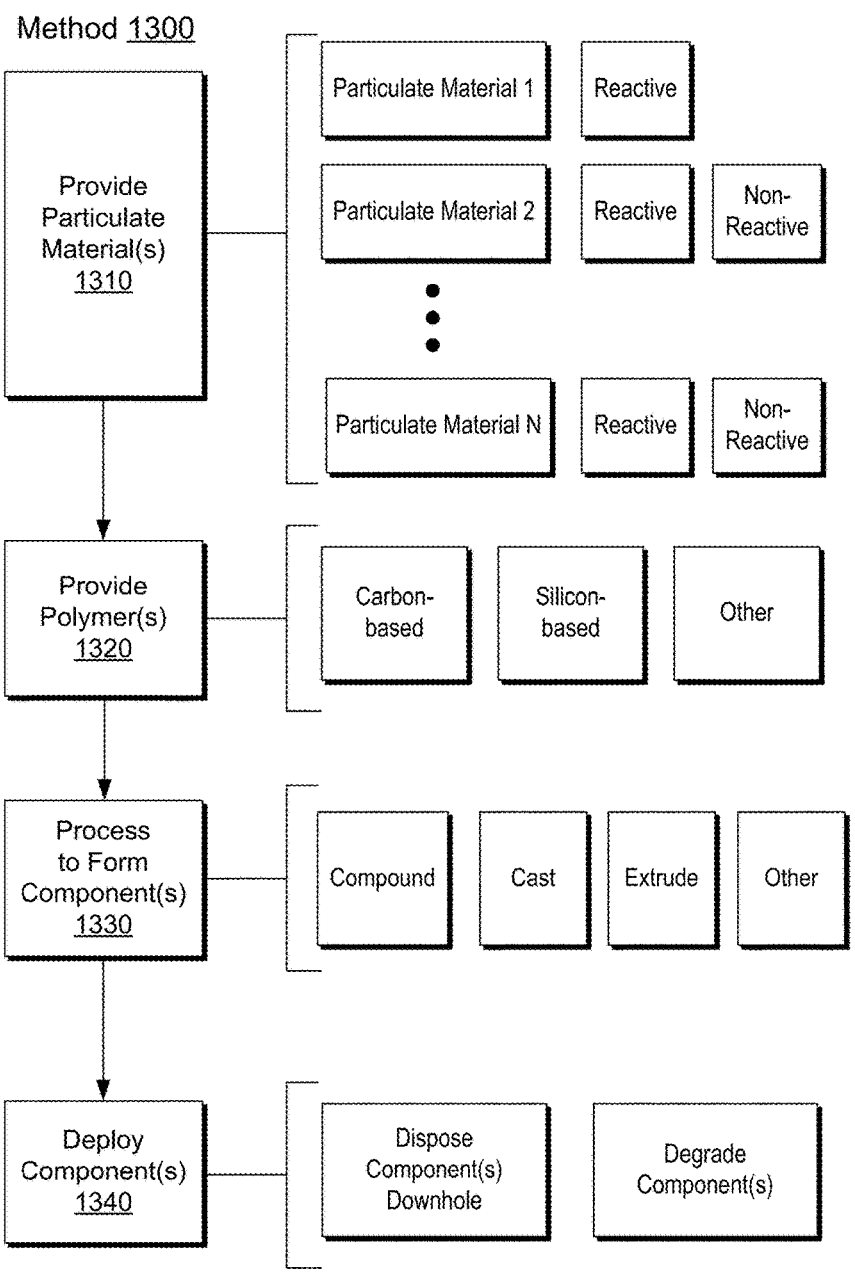
FIG. 13 illustrates an example of a method.

FIG. 13 shows an example of a method 1300 that includes a provision block 1310 for providing one or more particulate materials, a provision block 1320 for providing one or more polymeric materials, a process block 1330 for processing materials to form one or more components and a deployment block 1340 for deploying one or more components, for example, as formed per the process block 1330 and optionally one or more additional components.

As shown in FIG. 13, the provision block 1310 can include providing one or more different types of particulate materials where at least one of the particulate materials is reactive in that it can degrade (e.g., degrade in an aqueous solution). As an example, one or more of the particulate materials may be produced by and/or subjected to one or more severe plastic deformation (SPD) processes. As an example, a material may be processed via cryomilling as an SPD process.

As an example, particulate material may be substantially spherical. For example, particulate material made from gas atomization may be substantially spherical. Such particulate material may enhance "packing" of such material within a polymeric matrix. As an example, a combination of different particle size distribution populations may be introduced into polymeric material and compounded to form a degradable polymeric material.

As an example, particulate material may be screened. For example, consider screening to "filter" out sub-micron sized particles, which may be substantially spherical (e.g., as produced via gas atomization).

As an example, a model may consider multimodal packing. For example, consider voids of larger particles packed with smaller particles, whose voids in turn may optionally be filled with even smaller particles, etc. (e.g., a form of geometrical progression). As an example, a population of particles with a progressive particle size distribution (PSD) may be separated into populations or, for example, separate populations of particles may be combined to form a progressive PSD (e.g., optionally a continuous PSD such as a power law PSD). As an example, a PSD may be Gaussian or another type of mathematical/statistical distribution.

As an example, a packing of particles may be characterized as a disordered packing. As an example, a so-called random loose packing (RLP) may have, for uniform spheres, a packing fraction in the limit of zero gravity of about 0.44 (e.g., void fraction of about 0.56); whereas, a so-called random close packing (RCP) may have, for uniform spheres, a packing fraction of about 0.64 (e.g., void fraction of about 0.36). RCP may be considered by some to be mathematically ill-defined and rather referred to as, for example, "maximally random jammed". As to RLP, it may be considered by some to be very loose random packing, for example, as achieved by spheres slowly settling.

As shown in FIG. 13, the provision block 1320 can include providing one or more different types of polymeric materials. As an example, a polymeric material may be considered to be carbon-based, silicon-based or based on another element or elements that can form a backbone.

As an example, the method 1300 of FIG. 13 can include mixing or blending one or more particulate materials and one or more polymeric materials to form a blend or a composite where, for example, the blend or composite can be further processed, for example, via compounding, etc. As an example, the method 1300 can include forming an intermediate product such as, for example, pellets that can be utilized in another process to form a product (e.g., via the process block 1330, etc.). In such an example, the intermediate product may optionally be utilized in one or more types of processes (e.g., extrusion, molding, etc.) to form a component or components.

As shown in FIG. 13, the process block 1330 can include one or more processes that can form a component. For example, consider a compounding process, a casting process, an extrusion process, heat ageing, etc. As an example, a compounding process may include reactive compounding (e.g., a chemical reaction process such as a polymerization process, etc.).

As an example, a component may include a relatively smooth surface and, upon cutting, a relatively rough surface. For example, roughness (e.g., in cross-section) may be imparted via inclusion of one or more particulate materials.

As an example, a component may be a structural element such as, for example, a joint that can connect components, a structural member, etc.

As shown in FIG. 13, the deployment block 1340 can include disposing one or more components in a downhole environment and degrading at least a portion of one of the one or more components in the downhole environment. As an example, the deployment block 1340 may also include ageing of one or more components in an environment or environments in which a component or components may be deployed. As an example, ageing can include heat treating.

As an example, a degradable polymeric material can be a water-reactive polymeric material that breaks down in aqueous fluids. For example, a degradable polymeric material can include water reactive material that is within a polymeric matrix where exposure to water may cause the water reactive material to degrade. As an example, a degradable polymeric material can be formed to have a defined strength and, for example, a defined elongation to failure in one or more environments (e.g., ambient to high pressure), which can enable the material, as a component, to perform a structural function prior to break down.

As an example, a degradable polymeric material can include one or more polymers that are amenable to hydrolysis such that upon exposure to water the one or more polymers themselves may break down. For example, certain bonds may be subject to hydrolytic attack upon exposure to water.

As an example, a polyamide polymers such as nylon 6,6 can undergo hydrolysis in the presence of aqueous fluids, which can cause depolymerization. As an example, a polyester can be susceptible to one or more types of polymer degradation reactions in the presence of water. As an example, a polyester may be prone to stress corrosion cracking upon exposure to water. As an example, a polymeric material that includes a polyester and a water reactive alloy can be formulated and formed to exhibit increased stress corrosion cracking when compared to the polymeric material with the water reactive alloy.

As an example, reactivity of a degradable polymeric material can be tailored by addition of one or more catalytic materials, which can include, for example, metallic powder forms with distinct particle size distributions.

As an example, one or more degradable polymeric components may be implemented in one or more tools, pieces of equipment, etc., for example, to achieve temporary structure (e.g., static and/or dynamic). As an example, an operation that performs multistage stimulation may employ one or more degradable structural elements, optionally as triggering components. For example, degradation of a structural element may trigger degradation or expedite degradation of one or more other components.

As an example, a degradable polymeric material may degrade upon exposure to brine (e.g., a selected brine or brine in a range from a dilute brine to a saturated brine). As an example, a degradable polymeric material may degrade upon exposure to water. As an example, an environment that includes brine, water, etc. may be under ambient or other conditions (e.g., consider high pressure and high temperature conditions). As an example, a target duration to breakdown and dissolution may be of the order of a day to months, for example, consider a target duration that is within a range from about 15 days to about 3 months.

Figure 14:
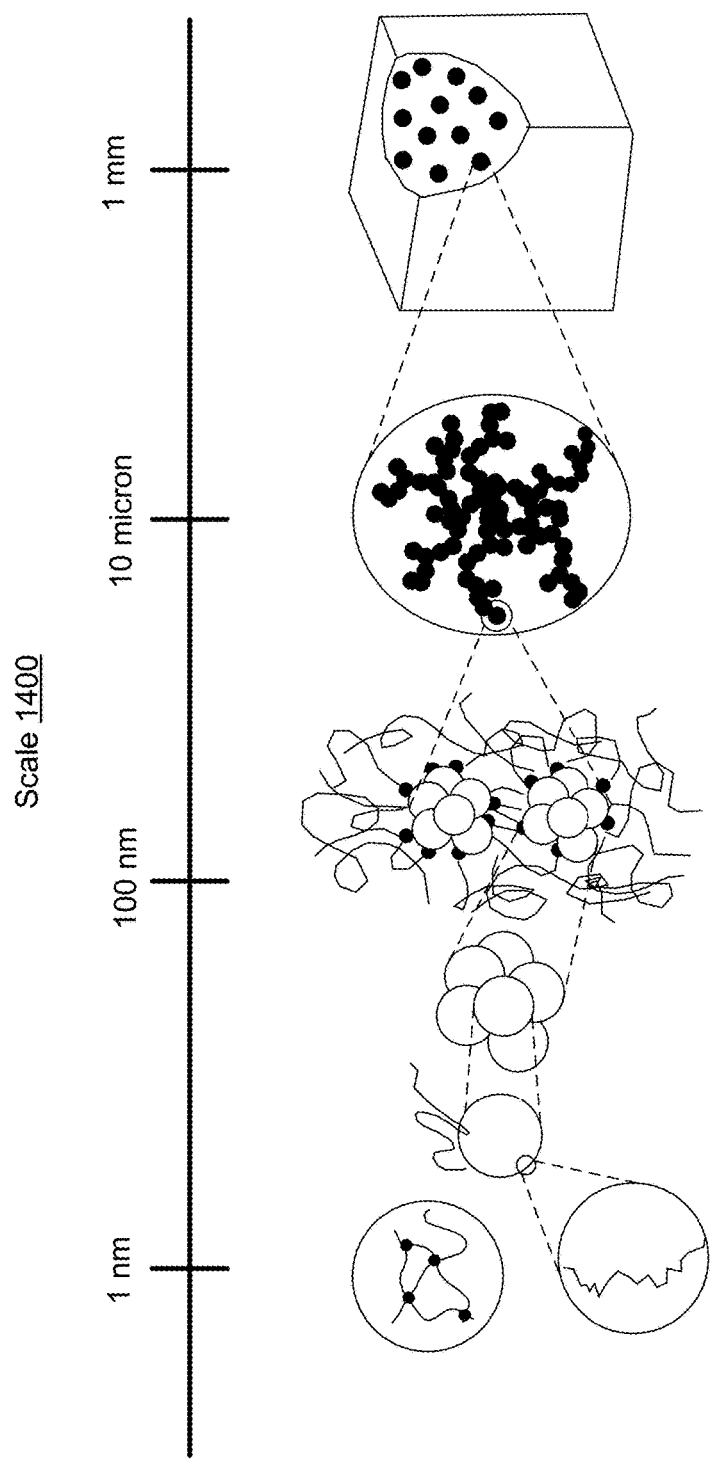
FIG. 14 illustrates an example scale with respect to various structures.

FIG. 14 shows an example scale 1400 with respect to examples of structures. As shown, the scale 1400 extends from about 1 nm to about 1 mm. The various structures include polymeric material and particles characteristic of carbon black in rubber.

As an example, degradable particles added to polymeric material may be characterized by particle size. For example, consider a particle size profile as follows: D90, about 50 microns to about 80 microns, target less than about 70 microns; D50, about 10 microns to about 30 microns, target less than about 18 microns; D10, about 1 micron to about 8 microns, target less than about 5 microns.

As an example, a method can include mixing a polymeric material with one or more ingredients to form a blend. For example, consider one or more of carbon black, silica, anti-oxidants, etc. As an example, such a polymeric material may be defined by its polymeric material viscosity and, for example, via one or more ingredients, its strength. For example, consider adding carbon black, silica, etc. to augment strength. As an example, sizes of additives may be selected to achieve desired properties.

As an example, a blend of polymeric material and degradable powder may be flowable. For example, such a blend (e.g., a composite) may be pourable to pour into a mold, etc. As an example, a blend may be extrudable, optionally extrudable over an object (e.g., a core, etc.). As an example, a multilayered object may be formed where at least one layer of the multilayered object includes a degradable polymeric material.

As an example, a degradable alloy material may be characterized by density and polymeric material may be characterized by density.

Thermoplastic elastomers (TPE), sometimes referred to as thermoplastic rubbers, are a class of copolymers or a physical mix of polymers (e.g., consider a plastic and a rubber) that include materials with thermoplastic and elastomeric properties. As an example, a difference between thermoset elastomers and thermoplastic elastomers can be characterized via type of cross-linking bonds in their structures.

As an example, a thermoplastic may be characterized in that it can be re-melted back into a molten state; whereas, for example, a thermoset may remain in a permanent solid state.

As an example, a thermoset material includes polymers that cross-link together during curing that tend to form irreversible chemical bonds. Such cross-linking impacts an ability to re-melt when heat is applied.

As an example, thermoplastic material (e.g., pellets, etc.) can soften and/or melt when heated and become more fluid as additional heat is applied. As an example, softened and/or molten thermoplastic material may be solidified when the temperature is cooled below a melting point of the thermoplastic material. Such a characteristic of a thermoplastic material can allow for remolding, recycling, etc.

As an example, a copolymer can be a polymeric material that includes at least two types of constituent units (e.g., structural units or blocks). As an example, a copolymer can be classified based on how these units are arranged along the chain. As an example, consider one or more of alternating copolymers (e.g., with regular alternating A and B units); periodic copolymers (e.g., with A and B units arranged in a repeating sequence such as (A-B-A-B-B-A-A-A-A-B-B-B) n); statistical copolymers that are copolymers in which a sequence of monomer residues follows a statistical rule; block copolymers that include two or more homopolymer subunits linked by covalent bonds (e.g., consider two or three distinct blocks as diblock copolymers and triblock copolymers, respectively).

As an example, a copolymer may be described in terms of existence of or an arrangement of branches in its polymeric structure. For example, linear copolymers include a single main chain whereas branched copolymers can include a single main chain with one or more polymeric side chains. Other types of branched copolymers can include star copolymers, brush copolymers, and comb copolymers. As an example, a copolymer that includes three distinct types of monomers may be referred to as a terpolymer.

As an example, TPE can be a class of polymeric material that include at least two types of characteristics, which can be due to two or more types of blocks. As an example, a TPE may exhibit some amount of behavior of a thermoset material; however, above a TPE's melt or softening temperatures, a TPE can be melt processable via thermoplastic processing techniques (e.g., to be reprocessed, remolded, etc.).

A TPE includes crystalline domains and amorphous domains, for example, along polymer chains (e.g., via blocks) and/or via a blend or blends crystalline polymers and amorphous polymers. As an example, a crystalline domain may act as heat-fugitive links that impart thermoplastic character and the amorphous domains may act as elastomeric links that impart elastomeric character. As an example, a crystalline domain may be referred to as being a hard phase and an amorphous domain may be referred to as being a soft phase. In a TPE, crystalline phase and amorphous phase can contribute to mechanical properties where, for example, a property may be associated more with one phase or the other.

As to a hard phase, it may impact plastic properties such as, for example, one or more of tensile strength, tear strength, and chemical and fluid resistance. As to a soft phase, it may impact elastomeric properties such as, for example, one or more of hardness, flexibility and compression set and tensile set.

TPEs can include, for example, styrenic block copolymers (TPE-S), thermoplastic olefins (TPE-O), elastomeric alloys (TPE-V or TPV), thermoplastic polyurethanes (TPU), thermoplastic copolyester, and thermoplastic polyamides As mentioned, a degradable polymeric material can include a polymeric matrix that includes particular material within the matrix. As mentioned, particular material can be degradable in a manner that causes a polymeric matrix to degrade.

As an example, a particulate material, suitable for inclusion in a polymeric matrix to form a degradable polymeric material, may be a powder. As an example, a powder may be defined as a dry, bulk solid composed of a number of particles that may, for example, flow relatively freely when shaken, tilted, etc. As an example, a powder may be a sub-class of a granular material. As an example, a particulate material may be a flowable material (e.g., flow relatively freely when shaken, tilted, etc.).

As an example, a particulate material such as, for example, a powder, may be characterized by one or more properties, parameters, dimensions, etc. As an example, a particulate material may be characterized by one or more particle sizes. Where a particle is spherical, the particle may be quantitatively defined by its diameter (e.g., or radius). Where a particle has an irregular shape that is not-spherical, a dimension may be defined by a diameter corresponding to the volume of the particle as equated to the volume of a sphere. As an example, a particle may be ellipsoidal and, for example, defined by a major axis length and/or a minor axis length.

As an example, a particle may include a shape other than spherical, ellipsoidal, etc. As an example, consider needle or rod shaped particles that may be characterized at least in part by an aspect ratio of a longest dimension to a shortest dimension (e.g., consider an aspect ratio of about 5 to 1 or more). As another example, consider plate or platelet shape particles, which may be characterized at least in part by planar dimensions and a thickness dimension.

As an example, particulate matter may be characterized at least in part by one or more of a particle population mean as an average size of a population of particles, a particle population median as a size where approximately 50 percent of the population is below and approximately 50 percent is above, and a particle population mode or modes, for example, a size with highest frequency.

As an example, particulate material may include particles that are substantially spherical in shape (e.g., optionally characterized by sphericity). In such an example, a particle may be characterized by a particle size that corresponds to a diameter (e.g., assuming spherical shape). As an example, a powder may include particles with corresponding particle sizes that are within a range of less than about 100 microns and greater than about 10 microns.

As an example, particles may include crystalline structures, for example, a particle may be greater than about 80 weight percent crystalline. In such an example, a particle may include an amorphous structure, for example, a particle may be less than about 20 weight percent amorphous and greater than about 80 weight percent crystalline.

Crystals tend to have relatively sharp, melting points as component atoms, molecules, or ions tend to be ordered with regularity (e.g., with respect to neighbors). An amorphous solid can exhibit particular characteristics, for example, upon cleaving or breaking, an amorphous solid tends to produce fragments with irregular surfaces and an amorphous solid tends to exhibit poorly defined patterns in X-ray imaging. An amorphous, translucent solid may be referred to as a glass.

Various types of materials may solidify into an amorphous form where, for example, a liquid phase is cooled with sufficient rapidity. Various solids may be intrinsically amorphous, for example, because atoms do not fit together with sufficient regularity to form a crystalline lattice or because impurities disrupt formation of a crystalline lattice. For example, although the chemical composition and the basic structural units of a quartz crystal and quartz glass are the same (e.g., $SiO_2$ and linked $SiO_4$ tetrahedra), arrangements of atoms in space are not. Crystalline quartz includes an ordered arrangement of silicon and oxygen atoms; whereas, in quartz glass, atoms are arranged relatively randomly. As an example, when molten $SiO_2$ is cooled rapidly (e.g., at a rate of about 4 K/m in), it can form quartz glass; whereas, large quartz crystals (e.g., of the order of a centimeter or more) may have had cooling times of the order of years (e.g., thousands of years).

Aluminum crystallizes relatively rapidly; whereas, amorphous aluminum may form when liquid aluminum is cooled at a rate of, for example, about $4 \times 10^{13}$ K/s. Thus, cooling rate of aluminum can determine how atoms arrange themselves (e.g., regularly or irregularly).

As an example, a particle may be polycrystalline, for example, composed of crystallites (e.g., grains) that can vary in size and orientation. As an example, grain size may be determined using a technique such as X-ray diffraction, transmission electron microscopy, etc.

A grain boundary may be defined as the interface between two grains in a polycrystalline material. Grain boundaries, defects in crystal structure, tend to decrease electrical and thermal conductivity of material. Grain boundaries may be sites for precipitation of one or more phases, which may be referred to as grain boundary material. Grain boundaries may disrupt motion of dislocations through a material. As an example, reduction of grain size may improve strength, for example, as described by the Hall-Petch relationship.

As an example, grain boundaries may meet at a so-called grain boundary triple point (GBTP). At a GBTP (e.g., a volumetric space), a phase or phases (e.g., of grain boundary material) may exist that differ from that of crystalline material in a grain.

As an example, a powder may include particles that include grain sizes of less than about 2 microns. As an example, grain sizes may be less than about 1 micron. As an example, average grain sizes may be less than about 0.5 microns (e.g., less than about 500 nm). As an example, average grain sizes may be less than about 200 nm. As an example, material that exists between grains may be of a dimension of an order of tens of nanometers to an order of hundreds of nanometers. As an example, material that exists between grains may be of a dimension that is less than an average grain size. For example, consider grains with an average grain size of the order of hundreds of nanometers and grain boundary material with an inter-grain spacing dimension of the order of tens of nanometers.

As an example, a powder particle may include grains that include one or more materials at their boundaries. For example, a grain may be bound by a select material at its boundaries. As an example, a grain boundary material may coat a grain such that the grain is substantially encapsulated by the grain boundary material. As an example, a grain boundary material may be described as "wetting" a grain, for example, a grain boundary material may be continuous and wet an entire surface (e.g., boundary) of a grain. As an example, a particle can include grains that are in a continuum of a grain boundary material. In such an example, the grains may be spaced from each other by the grain boundary material. As an example, a size of the boundary (or the spacing between grains) may be of the order of tens of nanometers to hundreds of nanometers. The spacing between grains (e.g., the size of the grain boundary) may be determined at least in part based on the surface tension of the grain boundary material and the grain. Thus, for example, spacing may vary depending on the material in the grain boundary and the material of the grain. As an example, strength of a powder particle may be approximated at least in part by a relationship such as, for example: $\propto 1/\sqrt{\overline{d}}$, where $\overline{d}$ is the average grain size and a is the energy of the grain boundary.

As an example, to form a continuous grain boundary, a boundary forming component of a melt may be greater than about two percent by weight. For example, consider a melt of an aluminum alloy and gallium where the gallium is present at a weight percent greater than about two percent and less than about 20 percent (e.g., optionally less than about 10 percent, and in some examples less than about five percent). In such an example, atomization of the melt can form particles with grains that reside in a continuum of grain boundary material that includes gallium (e.g., a substantially continuous boundary material that includes gallium). In such an example, more than about 90 percent of the gallium can be preferentially segregated to the grain boundary (e.g., located within the grain boundary material). While higher percentages of gallium may optionally be included in a melt, in general, a higher the percentage of gallium can result in formation of globular nodules within a particle. Such globular nodules can result in a reduction of mechanical strength of a particle. Where a powder is to be used to form a part or a tool (e.g., a downhole tool) that is to withstand certain mechanical force(s), yet be degradable, the powder may be formed of a melt that is tailored to meet mechanical force and degradability criteria. As an example, a degradability criterion may be met by including at least about two percent by weight of a select material (e.g., or materials) in a melt. In such an example, a powder formed by the melt can be at least about two percent by weight of the select material (e.g., considering material conservation). As an example, a powder may be of at least about two percent by weight of a select material (e.g., or select materials).

As an example, a melt may include greater than about 80 percent by weight of an aluminum alloy and greater than about two percent by weight of a select material or materials. In such an example, consider as the select material, or materials, one or more of gallium, indium, tin, bismuth, and lead. As an example, a select material or materials may include one or more basic metals where, for example, basic metals include gallium, indium, tin, thallium, lead and bismuth (e.g., basic metals of atomic number of 31 or greater). As an example, grain boundary material may include aluminum, which is a basic metal with an atomic number of 13, in addition to one or more other basic metals. As an example, a basic metal may be a post-transition metal (e.g., metallic elements in the periodic table located between the transition metals (to their left) and the metalloids (to their right) and including gallium, indium and thallium; tin and lead; and bismuth). As an example, a melt may optionally include mercury, which is a transition metal (e.g., a group 12 transition metal). As an example, a powder formed of such a melt can include mercury, which may be a boundary material that bounds grains of particles of the powder. As an example, a melt may optionally include zinc, which is a transition metal (e.g., a group 12 transition metal).

As an example, a melt and a powder formed from the melt can include one or more alkali metals. For example, consider one or more of lithium, sodium, and potassium. As an example, a melt and a powder formed from the melt can include one or more alkaline earth metals. For example, consider one or more of beryllium, magnesium, calcium, strontium and barium. As an example, a powder and/or a melt may include one or more rare earth elements. As an example, a powder and/or a melt may include scandium, thallium, etc.

As an example, one or more of an alkali metal, an alkaline earth metal, or a basic metal may be used as the select material or materials for a melt. As an example, a melt may include gallium and indium. The gallium and indium may preferentially segregate to the grain boundary, for example, during a severe plastic deformation process, resulting in a desired powder particle. Materials of an aluminum alloy, such as, for example, aluminum, magnesium, silicon, copper, for example, may also appear in the grain boundary.

As an example, consider cooling a melt that includes aluminum, magnesium and gallium such that grains form with a first amount of gallium and such that at the boundaries of the grains material forms with a second amount of gallium that exceeds the first amount of gallium. In such an example, the material at the boundaries may be characterized as gallium enriched. In such an example, the amount of gallium in the grains may be negligible (e.g., grains may be formed of an aluminum alloy substantially devoid of gallium).

As an example, a material may include aluminum (e.g., melting point of about 1220 degrees F., about 660 degrees C. or about 930 K), magnesium (e.g., melting point of about 1200 degrees F., about 650 degrees C. or about 920 K) and gallium (e.g., melting point of about 86 degrees F., about 30 degrees C. or about 300 K). Such a material may be provided in a molten state and cooled to form grains and boundaries where the boundaries are enriched in gallium (e.g., a low melting point material of the bulk material).

As an example, a material may include gallium, indium and tin. In such an example, gallium, indium (e.g., melting point of about 314 degrees F., about 157 degrees C. or about 430 K) and tin (e.g., melting point of about 450 degrees F., about 232 degrees C. or about 500 K) may alloy (e.g., forming a eutectic alloy with a melting point of about −19 degrees C., about −2 degrees F. or about 250 K). Such a material may be provided in a molten state and cooled to form grains and boundaries where the boundaries are enriched in at least gallium (e.g., as an alloy of gallium, indium and tin as a low melting point material of the bulk material).

As an example, a material may include aluminum, magnesium and copper (e.g., melting point of about 1990 degrees F., about 1090 degrees C. or about 1360 K). In such an example, the material may experience an increase in strength when subjected to solution heat treatment and quenching. As an example, an aluminum, magnesium and copper alloy may increase in strength and exhibit considerable ductility upon ageing at ambient temperature (e.g., about 25 degrees C. or about 300 K).

As an example, an alloy may be characterized by a series designation. For example, consider the following series that include aluminum: 1000 series alloys that include a minimum of 99 weight percent aluminum content by weight, 2000 series alloys that include copper, 3000 series alloys that include manganese, 4000 series alloys that include silicon, 5000 series alloys that include magnesium, 6000 series alloys that include magnesium and silicon, 7000 series alloys that include zinc, and 8000 series alloys that include one or more other elements not covered by other series (e.g., consider aluminum-lithium alloys).

As an example, alloys that include aluminum may be represented by designations such as: 1xx.x series that include a minimum of 99 percent aluminum, 2xx.x series that include copper, 3xx.x series that include silicon, copper and/or magnesium, 4xx.x series that include silicon, 5xx.x series that include magnesium, 7xx.x series that include zinc, 8xx.x series that include tin and 9xx.x that include other elements.

As to 1000 series alloys, with aluminum of 99 percent or higher purity, such alloys may be characterized by considerable resistance to corrosion, high thermal and electrical conductivity, low mechanical properties and workability, while tending to be non-heat treatable.

As to 2000 series alloys, these include copper as an alloying element, which tends to impart strength, hardness and machinability; noting that such alloys tend to be heat treatable.

As to 3000 series alloys, these include manganese as an alloying element and they tend to have a combination of corrosion resistance and formability while tending to be non-heat treatable.

As to 5000 series alloys, these include magnesium as an alloying element, which may be, for example, optionally included along with manganese to impart a moderate- to high-strength, non-heat-treatable alloy. A 5000 series alloy may be weldable and relatively resistance to corrosion (e.g., even in marine applications).

As to 6000 series alloys, these include magnesium and silicon in various proportions to form magnesium silicide, which makes them heat treatable. Magnesium-silicon (or magnesium-silicide) alloys tend to possess good formability and corrosion resistance with high strength.

As to 7000 series alloys, these include zinc as an alloying element and, for example, when coupled with a smaller percentage of magnesium, such alloys may tend to be heat-treatable and of relatively high strength.

As an example, a material may be degradable and, for example, an alloy may be degradable (e.g., a degradable alloy). As an example, a material may degrade when subject to one or more conditions (e.g., over time). For example, consider one or more environmental conditions and/or "artificial" conditions that may be created via intervention, whether physical, chemical, electrical, etc. As an example, conditions can include temperature, pressures (e.g., including loads and forces), etc.

As an example, a degradable alloy may degrade at least in part due to presence of internal galvanic cells (e.g., that provide for galvanic coupling), for example, between structural heterogeneities (e.g. phases, internal defects, inclusions, etc.). As an example, a degradable material may resist passivation or, for example, formation of one or more stable protective layers.

As an example, a degradable alloy can include one or more alloying elements "trapped" in "solid solution". As an example, a material may include a metal such as aluminum, which may be impeded from passivating or building a resilient protective layer (e.g., aluminum oxide such as $Al_2O_3$).

As an example, a material can include one or more ceramics. For example, a material can include an inorganic, nonmetallic solid that includes metal, nonmetal or metalloid atoms, at least in part held in ionic and covalent bonds. A ceramic may be regular and/or irregular in structure, for example, atoms may be regularly oriented and crystalline, semi-crystalline and/or amorphous (e.g., ceramic glass). As an example, a ceramic may be an oxide (e.g., alumina, beryllia, ceria, zirconia, etc.). As an example, a ceramic may be a nonoxide (e.g., carbide, boride, nitride, silicide, etc.). As an example, a ceramic may include an oxide and a nonoxide.

As an example, a material can include one or more oxides. As an example, during processing of an alloy in the presence of oxygen, one or more oxides may form. For example, consider an alloy that includes aluminum where alumina (e.g., an aluminum oxide, $Al_2O_3$) forms. As another example, consider an alloy that includes silicon where silica (e.g., a silicon oxide, $SiO_2$) forms. As an example, an oxide may be a dispersed material in a particle. As an example, an oxide may be of a size of about 10 nm or less and optionally about 5 nm or less.

As an example, a material can include concentrations of one or more solute elements, for example, trapped in interstitial and in substitutional solid solutions. As an example, concentrations, which may be spatially heterogeneous, of such one or more solute elements, may be controlled through chemical composition, processing, etc. As an example, consider rapid cooling where solubility is higher than at ambient temperature or temperature of use.

As an example, a material may include one or more elements or phases that liquate (e.g., melt, etc.) once elevated beyond a certain temperature, pressure, etc., which for alloys may be predictable from phase diagrams, from thermodynamic calculations (e.g., as in the CALPHAD method), etc.

As an example, a material may "intentionally" fail via liquid-metal embrittlement, for example, as in an alloy that includes gallium and/or indium. As an example, a degradable material may include an alloy or alloys and possess phases that may be susceptible to creep (e.g., superplastic)

deformation (e.g., under intended force, etc.), possess phases that are brittle (e.g., which may rupture in response to impact, etc.).

As an example, a degradable material may include a calcium alloy such as, for example, calcium-lithium (Ca—Li), calcium-magnesium (Ca—Mg), calcium-aluminum (Ca—Al), calcium-zinc (Ca—Zn), calcium-lithium-zinc (Ca—Li—Zn), etc. As an example, in a calcium-based alloy, lithium may be included in concentrations, for example, between about 0 to about 10 weight percent (e.g., to enhance reactivity, etc.). As an example, concentrations ranging from about 0 to about 10 weight percent of one or more of aluminum, zinc, magnesium and silver may enhance mechanical strength.

As an example, a material may include one or more magnesium-lithium (Mg—Li) alloys, for example, enriched with tin, bismuth and/or one or more other low-solubility alloying elements.

As an example, a material can include one or more alloys of aluminum. As an example, a material may include one or more of an aluminum-gallium (Al—Ga) alloy and an aluminum-indium (Al—In) alloy. As an example, a material may include one or more of an aluminum-gallium-indium (Al—Ga—In) and an aluminum-gallium-bismuth-tin (Al—Ga—Bi—Sn) alloy.

As an example, a material can include aluminum, gallium and indium. For example, consider a material with an alloy of about 80 weight percent aluminum, about 10 weight percent gallium and about 10 weight percent indium. Such a material may include Vickers microhardness (500 g) of about 32 (#1), 34 (#2), 34 (#3), 30 (#4), 35 (#5), 36 (#6) and 33 (average) and estimated strength of about 100 (MPa), 15 (ksi) and 1.5 (normalized).

As an example, a component may be formed of material that provides a desired degradation rate and desired mechanical properties (e.g., strength, elasticity, etc.). As an example, a degradation rate may depend upon one or more conditions (e.g., temperature, pressure, fluid environments), which may be exist in an environment and/or may be achieved in an environment (e.g., via one or more types of intervention). As an example, a material may be conditionally degradable (e.g., degradable upon exposure to one or more conditions).

As an example, a material may be a metal matrix composite (MMC), which is a composite material with at least two constituent parts, one being a metal, the other material may be a different metal or another material, such as a ceramic or organic compound. When at least three materials are present, it may be referred to as a hybrid composite. As an example, a MMC may be complementary to a cermet.

As an example, a method may utilize one or more powder metallurgy (PM) techniques. As an example, one or more powder metallurgy techniques may be utilized to form particulate material. As an example, one or more powder metallurgy techniques may be utilized to form a blend of particulate materials. As an example, one or more powder metallurgy techniques may be utilized to form a component or components, for example, from a blend of particulate materials.

As an example, a material may be tailored as to one or more of its mechanical properties and/or its dissolution characteristics (e.g., degradation characteristics) via one or more processes, which can include one or more SPD processes. In such an example, the material may be refined as to its grain size and/or the defect structure of its grain boundaries. As mentioned, the Hall-Petch relation can exhibit a minimum size, which may be surpassed depending on desired properties and/or characteristics of a material. For example, such a material may still be strengthened when compared to a non-SPD processed material yet include a structure size that is less than the minimum Hall-Petch relation size, which may, for example, benefit dissolution (e.g., in a desired manner).

As an example, near-nanostructured or ultrafine-grained (UFG) materials may be defined as materials having grain sizes whose linear dimensions are in the range of, for example, about 100 nm to about 500 nm. Such materials may optionally be or include alloys and, for example, be formed at least in part via one or more severe plastic deformation (SPD) processes. For example, an atomized powder may be subjected to one or more SPD processes.

In contrast to coarse-grained counterparts, near-nanostructured or UFG materials may benefit from reduced size or dimensionality of near nanometer-sized crystallites as well as, for example, from numerous interfaces between adjacent crystallites.

As an example, a process can include rapid cooling to achieve a desired rate of cooling of material. As an example, a powder metallurgy (PM) process can refine features and improve properties of material. For example, grain size can be reduced because of the short time available for nuclei to grow during solidification. As an example, rapid cooling can increase one or more alloying limits in aluminum, for example, by enhancing supersaturation, which can enable greater precipitation-hardening with a reduction in undesirable segregation effects that may occur when IM alloys are over-alloyed. Moreover, elements that are low in solubility (e.g., practically insoluble) in a solid state may be soluble in a liquid state and may be relatively uniformly dispersed in powder particles during a process that employs rapid solidification. Non-equilibrium metastable phases or atom 'clusters' that do not exist in more slowly cooled ingots may be created by employing a rapid solidification rate; such phases can increase strength.

As an example, a process can include introduction of one or more features via powder surfaces, for example, as scale of particles becomes finer, surface-to-volume ratio of the particles increases.

As an example, one or more oxides can be introduced on a desired scale from powder surfaces by mechanical attrition, for example, to result in oxide dispersion strengthening (ODS).

As an example, a process may include introducing one or more carbides ($B_4C$, SiC, etc.). As an example, a process may include introducing one or more insoluble dispersoids (e.g., one or more materials that are practically insoluble in one or more defined environments).

As an example, a process can include cold-working powder particles by ball-milling. For example, a process can include cold-working powder particles in a cryogenic medium (e.g., or cryogenic media). Such a process can result in increased dislocation strengthening and, upon consolidation, a finer grain (and sub-grain) size which can be further stabilized by one or more ceramic dispersoids (e.g., as may be introduced during such a SPD process).

As an example, a method can include naturally ageing one or more components in a wellbore at one or more wellbore temperatures for one or more periods of time to thereby alter properties of the one or more components, which may be at least in part degradable.

As an example, a component may have an operational lifetime in a wellbore that is less than about 8 hours and then age in a manner at least in part thermally that causes the component to fail more readily. In such an example, where the component is degradable in the wellbore environment, ageing may assist with degradation, for example, via one or more failure mechanisms (e.g., elongation to failure, etc.).

As an example, a material may undergo Ostwald ripening where a portion of smaller entities dissolve and redeposit on larger entities. For example, consider small crystalline grains dissolving and constituents thereof redepositing onto larger crystalline grains such that the larger crystalline grains increase in size. Near a larger crystalline grain, a zone may exist, which may be due to a gradient or gradients in composition. As an example, intermetallic precipitates may form about a larger crystalline grain, which may be considered a macroscopic process (e.g., on a scale of about 50 microns).

As an example, a material may be treated to undergo Ostwald ripening and halo-ing to achieve desired properties, which can include dissolution rate, strength and/or ductility. For example, a haloed entity in the material may dissolve at a rate that differs from smaller entities in the material. As an example, a treatment may aim to achieve a population density of haloed entities to smaller entities, for example, to tailor one or more of dissolution rate, strength and ductility.

As an example, a water reactive or degradable powder can be blended with thermally stable nanocrystalline grains processed by cryomilling and further stabilized by inclusion of one or more types of dispersoids (e.g., SiC, $B_4C$, $Al_2O_3$, etc.).

As an example, a method can include using a blend of un-milled coarse powder(s) with a cryomilled-blend of water reactive or degradable powder (e.g., in a range of about 5 percent to about 95 percent) and one or more ceramic dispersoids (e.g., SiC, $B_4C$, $Al_2O_3$, etc.). In such an example, the average size of the water reactive powders or otherwise degradable powder is larger than the average size of the one or more ceramic dispersoids.

As an example, a method can include blending water reactive or degradable powder (e.g., in a range of about 5 percent to about 95 percent) with a material that includes thermally stable nanocrystalline grains processed by cryomilling. As an example, such a blend (e.g., a composite) may be further mixed with one or more monomers, polymers, etc. to form a degradable polymeric material. In such an example, composition of the blend of powder or powders may provide for tailoring a degradable polymeric material (e.g., for a particular application, etc.).

As an example, a method can include using a blend of water reactive or degradable powder from an inert gas atomization (IGA) tank, a first cyclone and a second cyclone, for example, to help maximize yield from melt that is atomized and to help produce a multi-powder size distribution. In such an example, the blend (e.g., in a range of about 5 percent to about 95 percent) may be further blended, for example, with thermally stable nanocrystalline grains processed by cryomilling and further blended with one or more dispersoids (e.g., SiC, $B_4C$, $Al_2O_3$, etc.).

Figure 15:
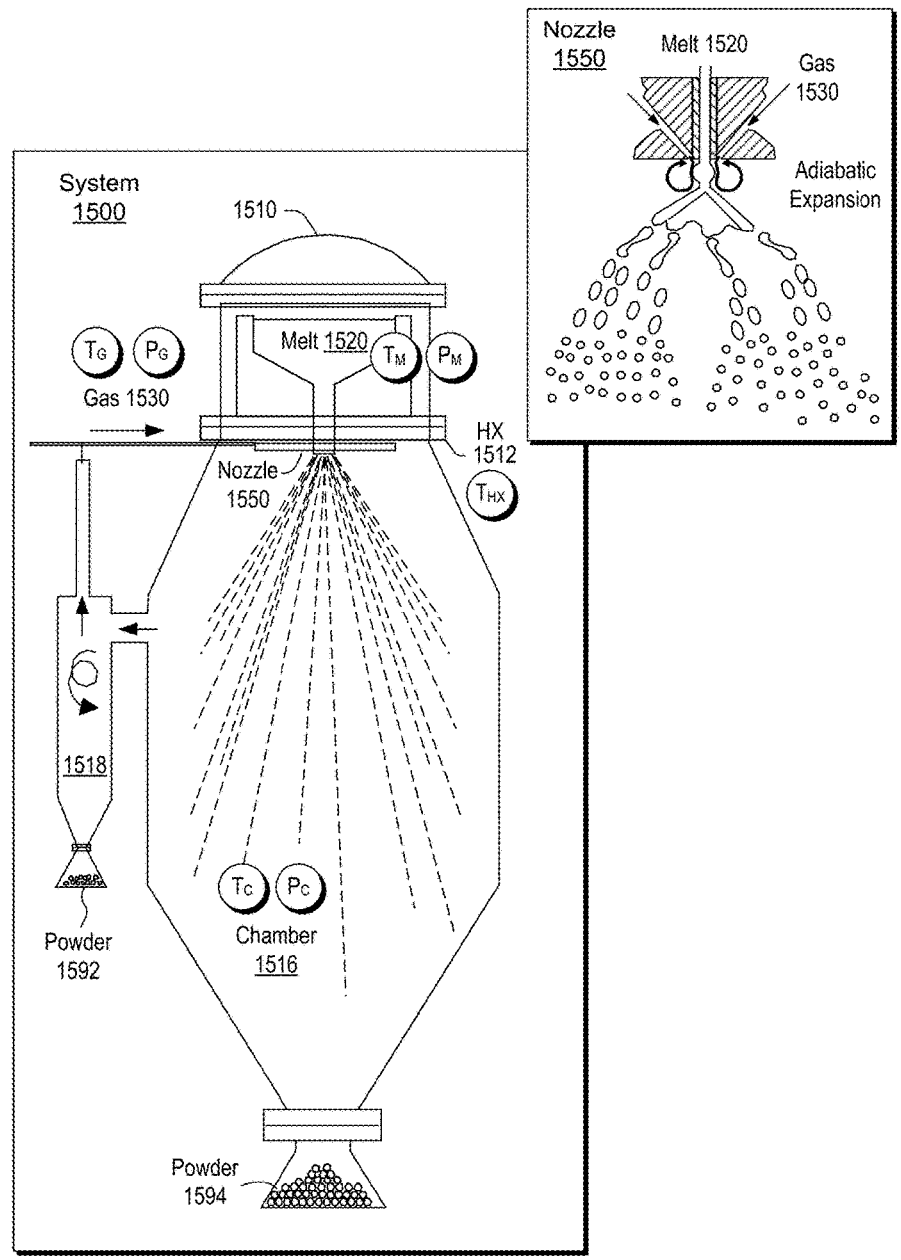
FIG. 15 illustrates an example of a system.

FIG. 15 shows an example of a system 1500 that can process a melt 1520 using gas 1530 to form particles. In such an example, the particles may be composed of melt constituents and/or composed of melt constituents and optionally one or more gas constituents (e.g., consider oxygen in the gas 1520 forming an oxide such as alumina upon exposure to aluminum in the melt 1520). Particles formed via the system 1500 may be powder particles 1592, 1594. The system 1500 may be considered to be a powder metallurgical system that can be implemented using powder metallurgy technology.

As shown in FIG. 15, the system 1500 includes a vacuum induction furnace 1510, an optional heat exchanger 1512 (HX), a chamber 1516, a cyclone chamber 1518, and a nozzle 1550. As illustrated, a rapid expansion of the gas 1530 as provided to the nozzle 1550 can break up the melt 1520, which may form a thin sheet and subsequently ligaments, ellipsoids and/or spheres (e.g., particles). In an example of an inert gas atomization process, particles formed may be substantially spheroidal. As an example, an atomization process may be a gas atomization process (e.g., including inert and/or non-inert gas), a water atomization process, a mechanical pulverization process, etc.

Particles may be collected in the chamber 1516 and in the cyclone chamber 1518, which can allow gas to exit and optionally recycle (e.g., with make-up gas, etc. to maintain a gas composition where multiple gases may be used). In such an example, the cyclone chamber 1518 may collect particles that are finer than the particles collected in the chamber 1516. Particles of either or both chambers 1516 and 1518 may be combined, separated, etc.

As an example, the system 1500 may include multiple cyclones, which may be in parallel and/or in series. For example, the system 1500 may include a cyclone in fluid communication with the cyclone 1518. As an example, particles collected (e.g., powder particles 1592, 1594) may be of different size distributions, etc., depending on where the particles are collected (e.g., chamber 1516, cyclone 1518, other cyclone, etc.).

As to operational parameters of an atomization process, consider, for example, alloy composition, melt feed rate, melt temperature, melt viscosity, heat exchanger temperature (e.g., heat transfer rate, etc.), gas pressure and temperature, type of gas, nozzle geometry, etc. Gas atomization may produce particles that are substantially spherical in their shapes and that include grains and grain boundaries. As an example, gas atomization may produce particles that include crystalline structure and/or amorphous structure.

As an example, a melt temperature (see, e.g., $T_m$) may be a superheated temperature. As an example, a melt temperature may be greater than about 650 degrees C. (e.g., greater than about 700 degree C. and optionally greater than about 800 degrees C.). As an example, a chamber such as the chamber 716 may be at a temperature of about 70 degrees C. (e.g., a temperature of the order of hundreds of degrees C. less than a melt temperature). As an example, gas may expand relatively adiabatically, which may facilitate cooling of melt and reducing thermal shock.

As an example, heat transfer may occur within a system such as the system 700 such that particles are crystalline, amorphous or crystalline and amorphous.

As an example, a method may include cooling melt at a rate that causes at least a portion of a particle formed from the melt to be amorphous. For example, a method may include cooling via a cryogenic cooled target (e.g., consider the heat exchanger 1512 of the system 1500). As an example, a cryogenic cooled target may be positioned in front of an atomizing nozzle, for example, to achieve a cooling rate (e.g., Rc) where vitrification occurs for atomized (melt) droplets (e.g., to be at least in part a metallic glass structure, which may be a bulk metallic glass structure). As an example, a material may be characterized at least in part by a glass transition temperature ($T_g$) where below that temperature an amorphous material may be glassy (e.g., whereas above $T_g$ it may be molten).

As an example, a method may include introduction of a gas at a low temperature. For example, consider introduction of helium in an atomization stream (e.g., introduction of helium as a gas, in a gas provided to a nozzle or nozzles).

As an example, a method may include increasing the superheating temperature of a melt, which may increase a driving force (e.g., a temperature differential) as to heat transfer (e.g., cooling). As an example, a method may include forming particles of a particular size or smaller such that heat transfer may occur more rapidly for the particles. For example, consider selecting a nozzle dimension (e.g., diameter, slit width, etc.) to achieve a particular particle size. As an example, a method may include analyzing dendrite arm spacing during cooling and adjusting one or more parameters of a gas atomization process such that amorphous particles may be formed.

As an example, a melt may be analyzed as to one or more properties such as, for example, a glass-transition or vitrification temperature (e.g., $T_g$). As an example, a system may be operated such that transformation takes place at the glass-transition temperature, $T_g$, below an equilibrium temperature for the solidification (e.g., a liquidus temperature, $T_L$), which may act to "freeze" an atomized melt in a non-equilibrium state (e.g., at least in part as an amorphous material). As an example, a liquidus temperature may be the maximum temperature at which crystals can co-exist with a melt in thermodynamic equilibrium. As an example, a method may consider a solidus temperature (Ts) that quantifies a point at which a material crystallizes. As an example, for a material, a gap may exist between its liquidus and solidus temperatures such that material can include solid and liquid phases simultaneously (e.g., akin to a slurry).

As an example, a method may include cooling a melt to produce an amorphous melt-span ribbon. In such an example, the ribbon may be further processed, for example, by mechanical crushing of the ribbon to form a powder.

As an example, a water reactive powder (e.g., a degradable powder) may be processed to form a component or components. In such an example, the powder may be produced by gas atomization (e.g., using one or more gases, optionally one or more inert gases), by ball milling, by crushing or other mechanical means, by sol-gel, etc.

As an example, a powder may include particles of one or more particle size distributions. For example, consider D90 less than about 44 microns (e.g., a mesh size of about 325), D90 less than about 60 microns, D90 less than about 90 microns, etc.

As an example, a material may be subjected to one or more SPD processes. As an example, a method can include employing one or more SPD processes.

As an example, where a method includes processing via ECAP, the method can include shearing of grains in consolidated or unconsolidated powder through a channeled die at low to high angles. As an example, ECAP can include passing material through a die (e.g., or dies) at various angles, which may abet refining of grains (e.g., of a water reactive powder), for example, to achieve a desired minimum grain size (e.g., after a certain number of ECAP passes). As an example, a method can include ECA pressing, for example, at one or more temperatures.

As an example, a method can include performing ECAP to abet refining of grains, for example, to achieve a minimum grain size (e.g., after a certain number of ECAP passes).

As an example, a method can include performing cryomilling to abet refining of grains, for example, to achieve a minimum grain size (e.g., after a certain duration of milling).

As an example, a method can include performing HPT to abet refining of grains, for example, to achieve a minimum grain size (e.g., after a certain number of HPT turns or revolutions).

As an example, a method can include performing cold working to abet refining of grains, for example, to achieve a minimum grain size (e.g., after a certain percentage of cold working).

As an example, a method may include controlling grain size. For example, consider alternating grain size from the point of inflection of an inverse Hall-Petch trend (e.g., varying for different alloys, consider about 50 nm) to an upper limit of ultrafine grains (e.g., about 1000 nm or 1 micron). As an example, a method can include controlling grain size by controlling one or more parameters of one or more SPD processes (e.g., cryomilling time, ECAP passes, HPT turns or revolutions, percentage of cold work, etc.).

As an example, a method can include processing water reactive powder via one or more SPD processes, for example, to tailor dissolution rate in a fluid, to tailor dissolution rates in various fluids, etc. As an example, a fluid may be a hydraulic fracturing fluid. As an example, a fluid may include a salt concentration or concentrations of salts. For example, consider a fluid that includes one or more of NaCl, KCl and $MgCl_2$. As an example, a fluid may be an aqueous fluid. Such an aqueous fluid may include one or more salts. As an example, a method may include varying percentages of one or more inhibited acid that may be used in one or more spearheading operations during hydraulic fracturing. As an example, a method can include tailoring dissolution rate (e.g., degradation rate) by controlling grain size. As an example, one or more SPD processes may be used for refining grains, for example, to achieve a minimum grain size (e.g., optionally altering grain size from the point of inflection of an inverse Hall-Petch trend).

As an example, dissolution rate (e.g., degradation rate) may be influenced by disruption of a continuous grain boundary network. One or more characteristics of such a network may be influenced by one or more SPD processes. As an example, dissolution rate (e.g., degradation rate) may be influenced by precipitation of an additional phase of dispersoids, for example, as may be processed during one or more other SPD processes.

As an example, a method can include precipitating second phase dispersoids. In such an example, the properties of such dispersoids may be influenced by choice of one or more cryogenic media. For example, consider use of one or more of liquid nitrogen and liquid argon. As an example, precipitation of second phase dispersoids may be influenced by choice of one or more grinding media. For example, consider use of one or more of low alloy/carbon steel balls, stainless steel balls, Ni alloy balls, ceramic balls, etc.

As an example, a gas atomization process can generate particles that may be characterized at least in part by size (e.g., consider a size distribution of about 10 microns to about 20 microns). In such an example, grains in particles may be of the order of about a micron. As an example, particles may be formed via gas atomization that include grains of the order of less than about one micron (e.g., optionally less than about half a micron).

As an example, a method may include one or more of the following processes and/or produce a material that includes one or more properties listed below (e.g., of a desired high strength degradable alloy): inert gas atomization (IGA) of a brittle cast melt with controlled flow through one or more nozzles (e.g., optionally of varying sizes) to yield powder particles of varying mesh size; particulate (approximately 80 percent to approximately 100 percent (e.g., approximately 90 percent) screened distribution) with sizes varying between about 10 microns and about 70 microns (e.g., between about 20 microns and about 60 microns).

Figure 16:
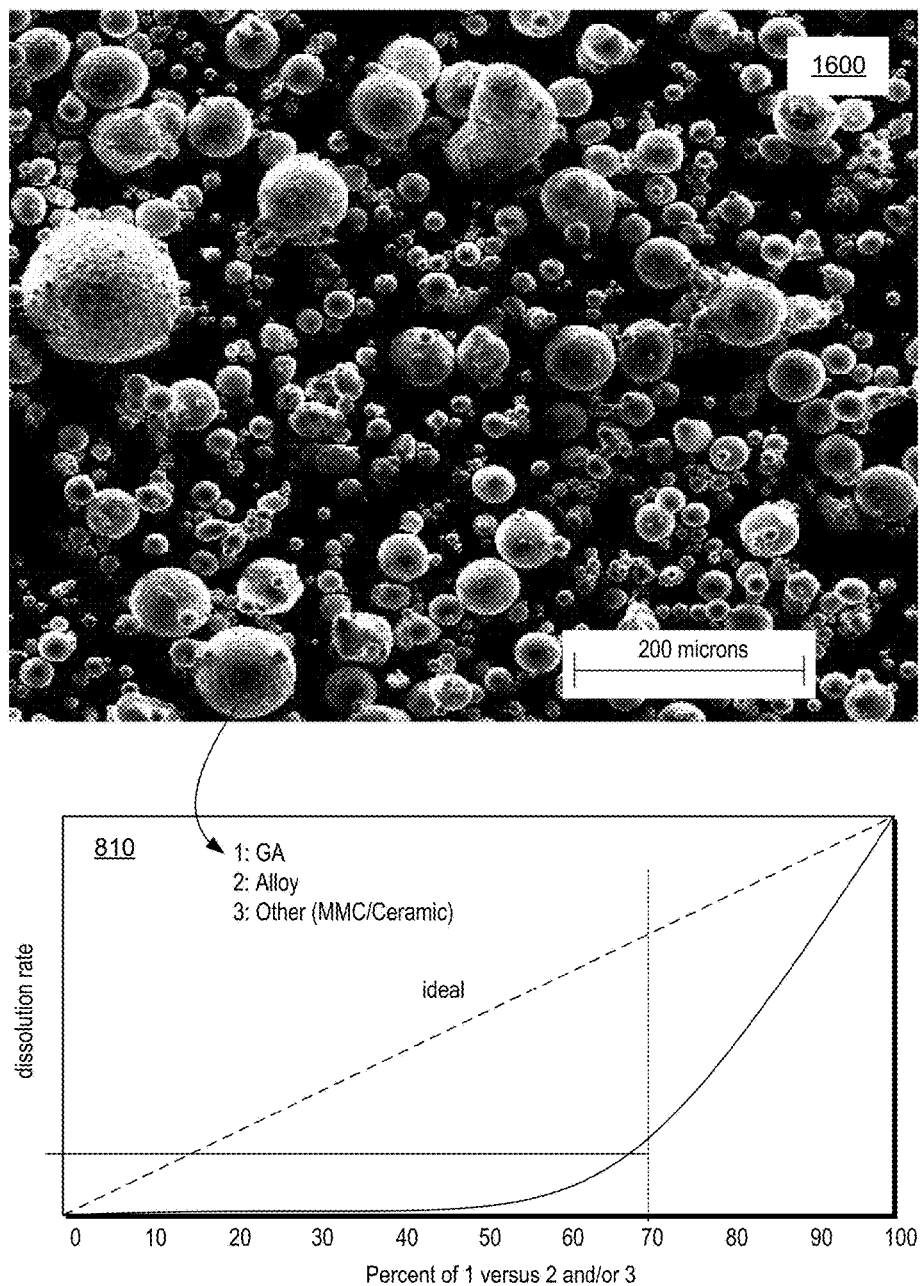
FIG. 16 illustrates an example of a micrograph of an example of particles and an example of a plot.

FIG. 16 shows a scanning electron micrograph 1600 of particles produced via gas atomization of a brittle cast melt. Such particles may be formed by cooling the melt as it exits a nozzle (see, e.g., the nozzle 1550 of the system 1500 of FIG. 15). Such cooling may be adiabatic cooling. For example, adiabatic cooling can occur when pressure on an adiabatically isolated system is decreased, allowing it to expand, thus causing it to do work on its surroundings. When the pressure applied on a parcel of gas is reduced, the gas in the parcel is allowed to expand; as the volume increases, the temperature falls as internal energy decreases.

As an example, a gas atomization process may "capture" melt in a particle as a supersaturated solid solution. As an example, a particle may include properties that can reduce segregation of alloying constituents in solid solution. As an example, a gas atomization process may yield fine to ultra-fine grain microstructure in particles that form a powder.

FIG. 16 also shows an example plot 1610 that illustrates an approximate relationship between dissolution rate and percent of a first material versus one or more other materials (e.g., a second material, a third material, etc.).

In the plot 1610, where the first material is a powder of degradable material formed at least in part via gas atomization (e.g., GA), the dissolution rate of a polymeric material formed of the constituent materials and one or more polymers (e.g., an optionally one or more additives) may be less than an "ideal". For example, the polymeric material may exhibit a relatively low dissolution rate (e.g., less than about 20 percent of a dissolution rate of the first material itself), until the first material approaches a certain percentage or range of percentages of the total. As an example, the change in dissolution rate may be more sensitive to the percentage of the first material in a particular range (e.g., a relatively high slope in dissolution rate versus percentage of the first material).

As an example, a process can generate particles with grains where, for example, the processing provides for segregation of one or more low melting point constituents at grain boundaries. In such an example, the one or more low melting point constituents can coat grains and through such coating form a galvanic couple.

As an example, particles of a powder may include grain boundary interfaces where intermetallic precipitates can form during one or more ageing process, which may, for example, result in additional strengthening of the material (e.g., alloy, alloy and ceramic, etc.).

As an example, a process may provide for weakening of grain boundary interfaces in a component formed of a powder produced via gas atomization, which may help to promote embrittlement of the boundaries and further enhance a degradation mechanism (e.g., or degradation mechanisms). For example, consider a particle of a material that includes aluminum and gallium where gallium enrichment at grain boundary interfaces may promote embrittlement of the boundaries and where at least gallium interacts with fluid in a manner that causes degradation of the particle. As an example, a component formed at least in part from such particles (e.g., via processing of such particles and optionally another material such as a polymeric material) may degrade upon exposure to fluid and via embrittlement.

As an example, a material may include one or more oxide dispersoids, which may provide enhanced thermal stability and strengthening, for example, due to pinning of grain boundaries and dislocations.

As an example, differential cooling of a warm powder may abet diffusion of one or more low melting point constituents from a trapped supersaturated solid solution to a grain interior along a grain boundary, for example, causing liquid-metal embrittlement, which may enhance a degradation mechanism (e.g., consider a mechanism where gallium interacts with fluid in a manner that causes degradation).

As an example, in a particle, material at a grain boundary may be enriched in gallium when compared to material in a grain. As an example, in a particle, material at a grain boundary may be enriched in indium when compared to material in a grain. As an example, in a particle, material at a grain boundary may be enriched in gallium and indium when compared to material in a grain.

As an example, a powder may respond to dissolution and may be reactive (e.g., upon exposure to fluid, etc.). As an example, a powder may be added to one or more polymers, for example, to produce a relatively homogeneous polymeric material that has a desired rate of degradation (e.g., when subjected to one or more conditions). As an example, degradation of powder, and hence a polymeric material made at least in part therefrom, can be controlled by blending of one or more other powders (e.g., of one or more mesh sizes, etc.).

As an example, one or more ceramic and/or other particulates may be added to a powder (e.g., or powders) to form a metal matrix composites (MMC).

An alloy can include crystalline, amorphous or mixed structure (e.g. partially crystalline, partially amorphous). Features characterizing the structure can include grains, grain boundaries, phases, inclusions, etc. As an example, one or more features may be of the order of macroscopic, micron or submicron scale, for instance nanoscale. Shape, size, shape and size, etc. may be characteristics that can influence mechanical properties and, for example, reactivity.

As an example, a reactive material may include an element that tends to form positive ions when its compounds are dissolved in a liquid solution and whose oxides form hydroxides rather than acids with water. As an example, a material may disintegrate. For example, consider an alloy that loses structural integrity and becomes dysfunctional for instance due to grain-boundary embrittlement or dissolution of one of its elements. As an example, a byproduct of degradation from grain boundaries may not necessarily include an ionic compound such as a hydroxide and may include a metallic powder residue (e.g., consider severely embrittled aluminum alloys of gallium and indium).

As an example, a material may be electrically conductive and may include a metallic luster.

As an example, a material may be degradable and, for example, an alloy may be degradable (e.g., a degradable alloy). As an example, a material may degrade when subject to one or more conditions (e.g., over time). For example, consider one or more environmental conditions and/or "artificial" conditions that may be created via intervention, whether physical, chemical, electrical, etc. As an example, conditions can include temperature, pressures (e.g., including loads and forces), etc.

As an example, a component may be made from a blend of particulate materials that include at least one age-hardenable particulate material. In such an example, the blend can include one or more degradable particulate materials and one or more non-degradable particulate materials. As an example, a component may be age-hardened prior to deployment, during deployment and/or after deployment.

As an example, a blend of particulate materials can include an aluminum alloy that may be an age-hardenable aluminum alloy. In such an example, the blend can include particulate material that is degradable, for example, when exposed to an aqueous environment. As an example, a component may be formed of a blend of materials where the component is age-hardenable and degradable in an aqueous environment (e.g., a downhole environment that includes water).

As an example, a material can include cryomilled nanocrystalline grains, which may be thermally stable. For example, a cryomilled nano and/or UFG solid may be thermally stable up to about 0.8 of an alloy's melting point.

As an example, a method can include thermal treatment of a water reactive or degradable alloy, which may be mixed with one or more polymeric materials to form a component. Such a method may include making a blend of cryomilled and un-milled particulate material. In such an example, the method can include solution annealing, which may act to put coarse un-milled grains into solution and promote precipitate hardening during an ageing cycle in an annealed fraction. In such an example, cryomilled nano grains may be retained from going into solution due to their enhanced thermal stability, however, growth may occur to a multimodal nano and/or UFG size abetting ductility to the blended solid.

As an example, an un-milled GA powder can be a water reactive powder. As an example, an un-milled GA powder can be formed of a melt of a heat treatable aluminum alloy series (e.g., consider 6XXX and/or 7XXX series). As an example, a cryomilled GA powder can be water reactive powder (e.g., degradable in an aqueous environment). As an example, a cryomilled GA powder can be formed of a melt of a heat treatable aluminum alloy series (e.g., consider 6000, 7000 series). As an example, a blend can be stabilized by ceramic particulates (e.g., SiC, $B_4C$, $Al_2O_3$, etc.) to produce a metal matrix composite (MMC). In such an example, addition of ceramic particulates may be before cryomilling or, for example, during blending of un-milled and cryomilled GA powders.

As an example, a method can include tailoring dissolution of a component. For example, such a method may include blending powders of one or more non-degradable alloys with one or more degradable powders and one or more polymeric materials (e.g., optionally as a powder, a melt, etc.).

As indicated, degradation of a component may be determined by a physical characteristic of the component and an environmental condition such as, for example, temperature. For example, fluid at a temperature of about 120 degrees C. may cause a component to degrade more rapidly than fluid at a temperature of about 66 degrees C. As an example, a component may be constructed to include one or more layers where at least one layer includes a degradable material, which may include a dimension (e.g., thickness, etc.). As an example, a layer may be a degradable polymeric material layer.

As an example, an assembly can include a plurality of pieces where such pieces may be formed according to desired dissolution rate, strength and/or ductility. In such an example, at least one of the pieces can be a composite material that includes a polymeric material and a water reactive alloy. As an example, a degradable piece may be a structural component that acts to carry a load, connect components, etc. In such an example, upon exposure to water, the degradable piece may degrade as to one or more of its structural properties. For example, the degradable piece may degrade to an extent that it can no longer carry a load, to an extent that it can no longer connect components, etc.

Figure 17:
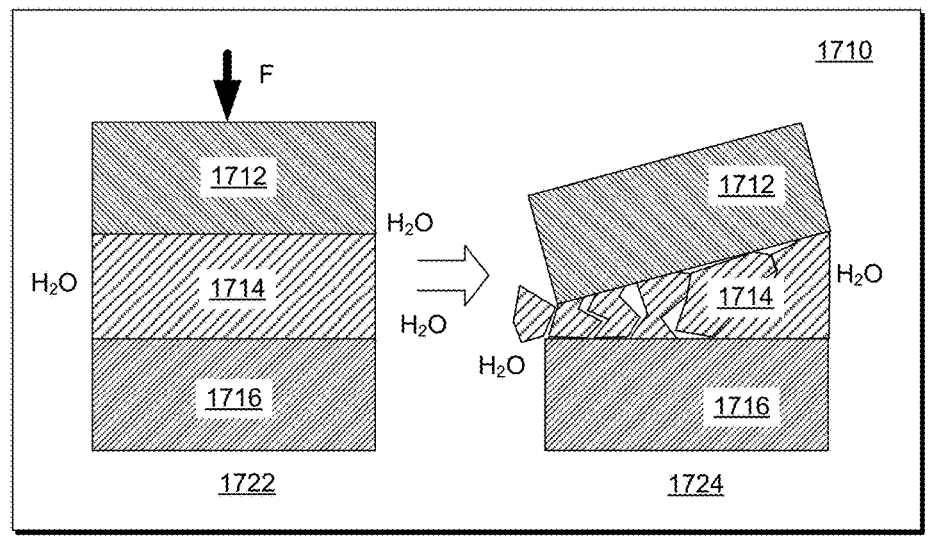
FIG. 17 illustrates examples of assemblies.
Figure 17:
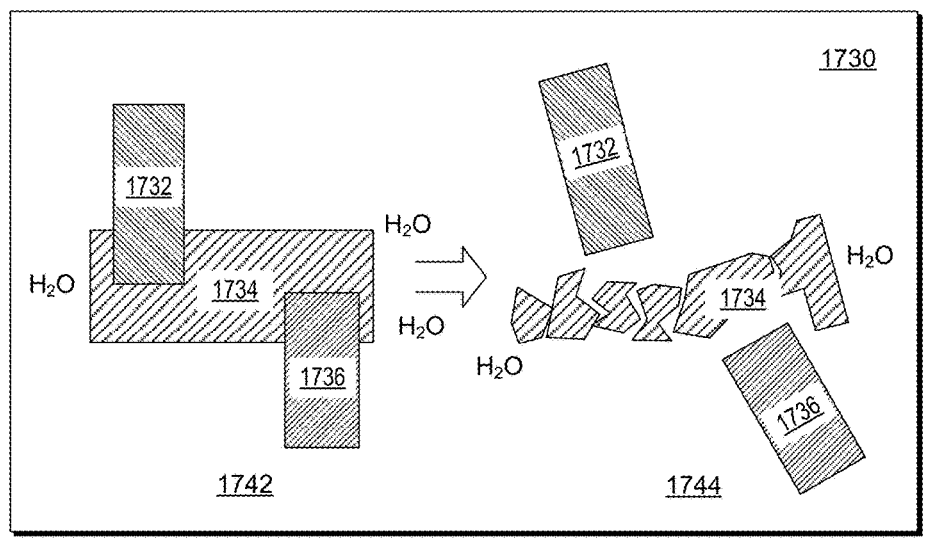

FIG. 17 shows an example assembly 1710 and an example assembly 1730 where a component 1714 and a component 1734 are made at least in part from a composite material that includes a polymeric material and a water reactive alloy where the composite material can degrade upon exposure to water ($H_2O$). As an example, the assembly 1710 and/or the assembly 1730 may be bore tools or a portion or portions of a bore tool or bore tools.

As to the example assembly 1710, the component 1714 can be a structural component that is disposed at least in part between two other components 1712 and 1716 where force may be applied to one or both of the components 1712 and 1716. In such an example, upon exposure to water, after a period of time, the component 1714 can experience a degradation in its structural properties and hence its ability to support the component 1712 as subjected to force (F). For example, the component 1714 may break into pieces such that the spatial relationship between the components 1712 and 1714 and 1716 changes.

In FIG. 17, the assembly 1710 is shown as transitioning from a first spatial relationship 1722 of the components 1712, 1714 and 1716 to a second spatial relationship 1724 of the components 1712, 1714 and 1716. In such an example, the component 1714 may break into pieces that may be transported via fluid flow, by gravity, etc. As an example, the components 1712 and 1716 may optionally be degradable, for example, at a slower rate than the component 1714.

As to the example assembly 1730, the component 1734 can be a structural component that acts to couple (e.g., connect) the two other components 1732 and 1736. In such an example, upon exposure to water, after a period of time, the component 1734 can experience a degradation in its structural properties and hence its ability to support the component 1732 and/or the component 1736. For example, the component 1734 may be a connector that can break into pieces such that the spatial relationship between the components 1732 and 1734 and 1736 changes.

In FIG. 17, the assembly 1730 is shown as transitioning from a first spatial relationship 1742 of the components 1732, 1734 and 1736 to a second spatial relationship 1744 of the components 1732, 1734 and 1736. In such an example, the component 1734 may break into pieces that may be transported via fluid flow, by gravity, etc. As an example, the components 1732 and 1736 may optionally be degradable, for example, at a slower rate than the component 1734.

As an example, a component may be a bridge plug. A bridge plug may be a downhole tool (e.g., a type of plug tool) that can be located and set to isolate a lower part of a wellbore.

As an example, a component may be a component of a fluid sampling bottle, a pressure housing, a pump shaft, a cable (e.g., wireline, a power cable, etc.), a bridge plug tool, a projectile (e.g., a drop ball, a dart, etc.), a drill stem stabilizer, etc. As an example, a component can be a component of a centralizer.

As an example, a component can be part of a borehole tool. As an example, a borehole tool may be a tool that is part of a borehole assembly (e.g., "BHA") or borehole system. As an example, a BHA may be a lower portion of the drillstring, including (e.g., from a bottom up in a vertical well) a bit, a bit sub, optionally a mud motor, stabilizers, a drill collar, a heavy-weight drillpipe, a jarring devices (e.g., jars) and crossovers for various threadforms. As BHA may provide force for a bit to break rock (e.g., weight on bit), survive a hostile mechanical environment and provide a driller with directional control of a borehole. As an example, an assembly may include one or more of a mud motor, directional drilling and measuring equipment, measurements-while-drilling tools, logging-while-drilling tools or other borehole tools.

As an example, a borehole tool may be a tool such as, for example, a tool operable in a downhole operation. For example, consider a plug as a tool, a plug tool, a centralizer, a sampling bottle, a wireline, a slickline, etc. As an example, one or more tools can include a degradable polymeric material.

As an example, an alloy may include one or more of the following group 13 elements: aluminum, gallium and indium. As an example, an alloy may include at least one of the following group 2 elements: magnesium and calcium.

As an example, a method can include providing particulate material that includes an aluminum alloy where the aluminum alloy is at least approximately eighty percent by weight of the first particulate material and that includes one or more metals selected from a group of alkali metals, alkaline earth metals, group 12 transition metals, and basic metals having an atomic number equal to or greater than 31, where the one or more metals selected from the group total at least approximately two percent by weight of the particulate material. Such a particulate material may optionally be blended with one or more other particulate materials. For example, consider blending with a second particulate material that includes at least one aluminum alloy selected from a group of series 2000, 5000, 6000, 7000, and 9000.

As an example, a particulate material can include at least one basic metal having an atomic number equal to or greater than 31 where, for example, the at least one basic metal having an atomic number equal to or greater than 31 is at least approximately two percent by weight of the particulate material.

As an example, particulate material can include gallium (e.g., as a basic metal). In such an example, the gallium can be at least approximately two percent by weight of the particulate material. In such an example, the presence of gallium may make the particulate material a degradable material (e.g., degradable in an aqueous environment). For example, gallium may coat grains (e.g., as grain boundary material). As an example, a particulate material can include indium. As an example, a particulate material can include gallium and/or indium, which may be present, for example, at at least approximately two percent by weight of the particulate material.

As an example, a particulate material can include at least one group 12 transition metal selected from a group of zinc and mercury. As an example, a particulate material can include at least one of gallium, indium, tin, bismuth, zinc, mercury, lithium, sodium and potassium.

A water reactive alloy (e.g., aluminum or other metal-based alloy) may be provided as a powder and mixed into a flowable polymeric material. In such an example, compounding may occur according to, for example, a temperature and time profile. As an example, a degradable polymeric material may be formed in a mold. In such an example, heating and pressure may be applied where compounding occurs. As an example, one or more additives may be provided that can adjust one or more rheological properties of a blend of materials, for example, to facilitate processing.

As an example, a method can include packing of powder within a polymeric matrix to form a degradable polymeric material. In such an example, the powder can include a water reactive material. As an example, a powder can be characterized by particle size and/or sphericity. As an example, packing may be controlled via one or more of particle size and sphericity. As an example, a powder may be screened to form populations of particles, which may be utilized to tailor a degradable polymeric material. As an example, a packing model may be utilized to tailor a degradable polymeric material, for example, consider a packing model that considers packing of spherical particles. As an example, a polymeric matrix can be a relatively contiguous phase that supports particles where the particles include water reactive material, which upon exposure to water, generate hydroxide that can cause degradation of the polymeric matrix. As an example, a method can include mixing powder with a flowable polymeric material to achieve a desired level of wetting of particles of the powder.

As an example, a method can include selecting a particle size of a powder with a particle shape where such powder can be included in a polymeric matrix at a relatively high percentage. In such an example, the polymeric matrix may be relatively contiguous (e.g., a network) with branches that are supportive yet of minimal size. As an example, a relatively uniform blend may be formed that includes water reactive particles where such a blend is then compounded to form a degradable polymeric material. As an example, such a blend may be referred to as a composite as it includes at least a polymeric material and at least a non-polymeric material such as, for example, particles of an alloy (e.g., an aluminum alloy, etc.).

As an example, the polymeric matrix can include bonds that can be subject to hydrolytic attack (e.g., hydrolysis). In such an example, the polymeric matrix may degrade upon exposure to water due at least in part to hydrolysis. As an example, an alloy may be water reactive and dispersed as particles in a polymeric matrix where, upon exposure to water, it may degrade (e.g., dissolve).

As an example, a method can include compounding a composite of materials where the materials include polymeric material and a degradable alloy material; and forming a degradable component from the compounded composite of materials. Such a method can include exposing the degradable component to water where the degradable alloy material reacts with the water to at least in part degrade the component.

As an example, degradable alloy material can include aluminum and one or more metals selected from a group consisting of alkali metals, alkaline earth metals, group 12 transition metals, and basic metals having an atomic number equal to or greater than 31.

As an example, one or more metals selected from a group of alkali metals, alkaline earth metals, group 12 transition metals, and basic metals having an atomic number equal to or greater than 31 can include at least one basic metal having an atomic number equal to or greater than 31. In such an example, the at least one basic metal having an atomic number equal to or greater than 31 can be at least approximately two percent by weight of a degradable alloy material.

As an example, one or more metals selected from a group of alkali metals, alkaline earth metals, group 12 transition metals, and basic metals having an atomic number equal to or greater than 31 can include gallium where, for example, the gallium is at least approximately two percent by weight of a degradable alloy material.

As an example, one or more metals selected from a group of alkali metals, alkaline earth metals, group 12 transition metals, and basic metals having an atomic number equal to or greater than 31 can include indium.

As an example, one or more metals selected from a group of alkali metals, alkaline earth metals, group 12 transition metals, and basic metals having an atomic number equal to or greater than 31 can include at least one member selected from a group consisting of gallium, indium, tin, bismuth, zinc, mercury, lithium, sodium and potassium.

As an example, a degradable component, which is made at least in part of a degradable polymeric material, can be degradable in an aqueous environment.

As an example, a degradable alloy material, which is within a polymeric matrix to form a degradable polymeric material, can include grain material that includes an aluminum alloy and grain boundary material.

As an example, a degradable component can be at least a portion of a borehole tool. As an example, a method can include degrading such a degradable component in a borehole.

As an example, a degradable alloy material can include substantially spherical particles. Such particles can be included within a polymeric matrix to form a degradable polymeric material.

As an example, a degradable alloy material can include gas atomized particles, for example, formed via a gas atomization process where a melt is passed through a nozzle or nozzles. In such an example, the process may be performed in a substantially inert gas environment (e.g., inert gas atomization, IGA).

As an example, a method can include compounding a composite of materials where the materials include polymeric material and a degradable alloy material (e.g., a water reactive alloy); and forming a degradable component from the compounded composite of materials.

As an example, a method can include compounding a composite of materials where the materials include polymeric material and a degradable alloy material; and forming a degradable component from the compounded composite of materials. In such an example, the degradable alloy material can include particles that can be characterized by a multimodal particle size distribution.

As an example, a degradable polymeric material can include a polymeric matrix; and degradable alloy particles where the degradable alloy particles include substantially spherical particles. As an example, such particles may be or include gas atomized particles.

As an example, a degradable polymeric material can be formed into a component that has a limited lifetime of use. In such an example, the component may be exposed to one or more cycles during the lifetime before the component is degraded (e.g., dissolved, etc.). As such a component may include a weight percent of water reactive alloy particles, the behavior of the component with respect to time may differ from a component made of polymeric material without the water reactive alloy particles.

As an example, a water reactive polymeric material may be tuned to degrade in brine (e.g., dilute to saturated) and water (e.g., from ambient to HPHT). As an example, a target duration to breakdown and dissolution may be selected to be of the order of hours, of the order of days, of the order of weeks, or the order of months.

As an example, a component can include a degradable polymeric material that includes a thermoplastic elastomeric matrix and alloy particles disposed at least in part within the matrix where the alloy particles include aluminum and one or more metals selected from a group of alkali metals, alkaline earth metals, group 12 transition metals, and basic metals having an atomic number equal to or greater than 31. In such an example, the one or more metals can include gallium.

As an example, alloy particles can be included at less than approximately 50 percent by weight of the degradable polymeric material. As an example, alloy particles can be included at less than approximately 30 percent by weight of the degradable polymeric material. As an example, alloy particles can be included at less than approximately 15 percent by weight of the degradable polymeric material. As an example, a degradable polymeric material can include a minimum amount of alloy particles by weight of approximately 0.25 percent. As an example, a degradable polymeric material can include a minimum amount of alloy particles by weight of approximately 1 percent.

As an example, a thermoplastic elastomeric matrix can include a thermoplastic polyester material. As an example, a degradable polymeric material can include a hydrolizable thermoplastic polyester material.

As an example, alloy particles can include a water reactive alloy that includes aluminum and gallium. As an example, a component can include degradable polymeric material that degrades upon exposure to water. As an example, such a degradable polymeric material can degrade via hydrolytic attack of the thermoplastic elastomeric matrix.

As an example, at a temperature of approximately 100 degrees C., a degradable polymeric material can have a flexural modulus that is at least 30 MPa. As an example, at a temperature of approximately 100 degrees C., a degradable polymeric material can have a flexural modulus that is at least 60 MPa. As an example, at a temperature of approximately 100 degrees C., a degradable polymeric material can have a flexural modulus that is at least 100 MPa.

As an example, at a temperature of approximately 22.5 degrees C., a degradable polymeric material can have a storage modulus that is at least approximately 600 MPa.

As an example, a degradable polymeric material can have a percent crystallinity of at least approximately 20 percent.

As an example, a structural component of a bore tool can include a degradable polymeric material such as, for example, a degradable polymeric material that includes thermoplastic elastomeric material that includes alloy particles. As an example, such a structural component can be a joint.

As an example, a method can include forming a degradable polymeric material where the forming includes compounding a composite of a thermoplastic elastomeric material that includes alloy particles that includes aluminum and one or more metals selected from a group of alkali metals, alkaline earth metals, group 12 transition metals, and basic metals having an atomic number equal to or greater than 31. In such an example, the one or more metals can include gallium.

As an example, a method can include compounding where the compounding may include reactive compounding.

As an example, a method can include forming that includes shaping a component of a bore tool. As an example, a method can include forming that includes forming pellets. In such an example, the pellets may be utilized in another forming process to form one or more components (e.g., via extrusion, molding, etc.). As an example, a method can include extruding a degradable polymeric material to form an extrudate, which may be a component or processed to become a component. As an example, a method can include injection molding a degradable polymeric material to form an injection molded component.

As an example, a method can include melting degradable polymeric material to form molten degradable polymeric material and solidifying the molten degradable polymeric material.

As an example, a method can include exposing degradable polymeric material to water and degrading the thermoplastic elastomeric material and, for example, degrading alloy particles dispersed in a matrix of the thermoplastic elastomeric material.

As an example, a method can include degrading a thermoplastic elastomeric material where degrading includes hydrolytically degrading polymer bonds.

As an example, a bore tool can include a degradable polymeric material that includes a thermoplastic elastomeric matrix and alloy particles disposed at least in part within the matrix where the alloy particles include aluminum and gallium. In such an example, the bore tool can include a joint that is made at least in part from the degradable polymeric material.

As an example, a bore tool can include a member that is made at least in part from degradable polymeric material where the member is in contact with a component of the bore tool. In such an example, the member may fail structurally when exposed to water at least in part via degradation of a polymeric matrix of the degradable polymeric material. Such structural degradation can make the member unsuitable to carry a load, as may be a function of the member as part of the bore tool. For example, a member may perform a function (e.g., a structural function) as part of a bore tool and then degrade structurally such that the member may fail (e.g., under load, etc.).

As an example, one or more methods described herein may include associated computer-readable storage media (CRM) blocks. Such blocks can include instructions suitable for execution by one or more processors (or cores) to instruct a computing device or system to perform one or more actions. As an example, equipment may include a processor (e.g., a microcontroller, etc.) and memory as a storage device for storing processor-executable instructions. In such an example, execution of the instructions may, in part, cause the equipment to perform one or more actions (e.g., consider a controller to control processing such as ECAP, cryomilling, extruding, machining, forming, cementing, fracturing, etc.). As an example, a computer-readable storage medium may be non-transitory and not a carrier wave.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 18:
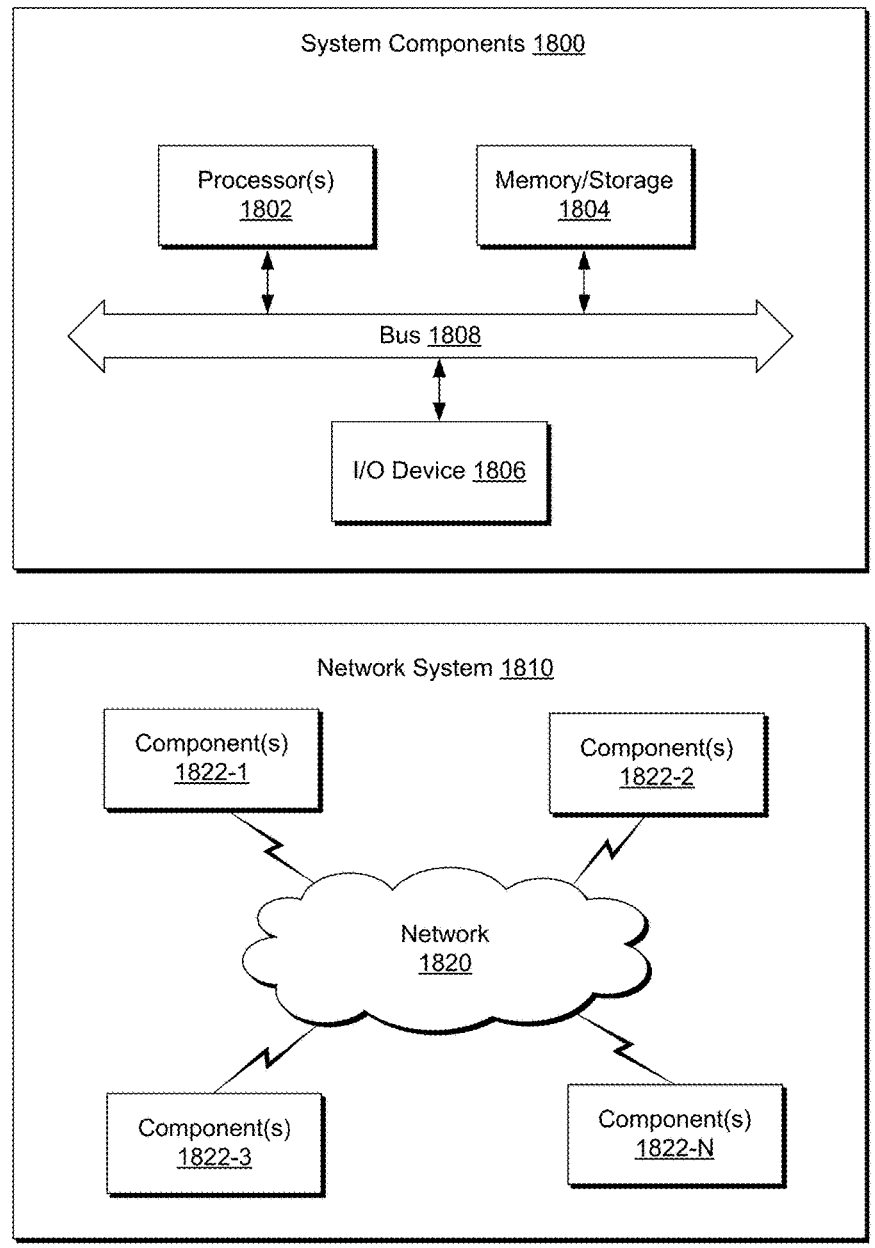
FIG. 18 illustrates example components of a system and a networked system.

FIG. 18 shows components of a computing system 1800 and a networked system 1810. The system 1800 includes one or more processors 1802, memory and/or storage components 1804, one or more input and/or output devices 1806 and a bus 1808. According to an embodiment, instructions may be stored in one or more computer-readable media (e.g., memory/storage components 1804). Such instructions may be read by one or more processors (e.g., the processor(s) 1802) via a communication bus (e.g., the bus 1808), which may be wired or wireless. As an example, instructions may be stored as one or more modules. As an example, one or more processors may execute instructions to implement (wholly or in part) one or more attributes (e.g., as part of a method). A user may view output from and interact with a process via an I/O device (e.g., the device 1806). According to an embodiment, a computer-readable medium may be a storage component such as a physical memory storage device, for example, a chip, a chip on a package, a memory card, etc.

According to an embodiment, components may be distributed, such as in the network system 1810. The network system 1810 includes components 1822-1, 1822-2, 1822-3, . . . , 1822-N. For example, the components 1822-1 may include the processor(s) 1802 while the component(s) 1822-3 may include memory accessible by the processor(s) 1802. Further, the component(s) 1822-2 may include an I/O device for display and optionally interaction with a method. The network may be or include the Internet, an intranet, a cellular network, a satellite network, etc.

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A component comprising:
a degradable polymeric material that comprises a thermoplastic elastomeric matrix and alloy particles disposed at least in part within the matrix wherein the alloy particles comprise aluminum and one or more basic metals having an atomic number equal to or greater than 31,
wherein the degradable polymeric material comprises a percent crystallinity of at least approximately 20 percent.

2. The component of claim 1 wherein the degradable polymeric material degrades upon exposure to water.

3. The component of claim 1 wherein the degradable polymeric material comprises a hydrolyzable thermoplastic polyester material.

4. The component of claim 1 wherein the thermoplastic elastomeric matrix comprises a thermoplastic polyester material.

5. The component of claim 1 wherein the alloy particles comprise less than approximately 50 percent by weight of the degradable polymeric material.

6. The component of claim 1 wherein the one or more metals comprise gallium.

7. The component of claim 1 wherein, at a temperature of approximately 22.5 degrees C., the degradable polymeric material comprises a storage modulus that is at least 600 MPa.

8. A component comprising:
a degradable polymeric material that comprises a thermoplastic elastomeric matrix and alloy particles disposed at least in part within the matrix wherein the alloy particles comprise aluminum and one or more basic metals having an atomic number equal to or greater than 31, wherein, at a temperature of approximately 100 degrees C., the degradable polymeric material comprises a flexural modulus that is at least 30 MPa.

9. The component of claim 1 comprising a structural component of a bore tool.

10. The component of claim 1 comprising a joint.

11. A method comprising:

forming a degradable polymeric material wherein the forming comprises compounding a composite of a thermoplastic elastomeric material that comprises alloy particles that comprise aluminum and one or more basic metals having an atomic number equal to or greater than 31, wherein the degradable polymeric material comprises a percent crystallinity of at least approximately 20 percent.

12. The method of claim 11 wherein the one or more metals comprise gallium.

13. The method of claim 11 wherein the forming comprises shaping a component of a bore tool.

14. The method of claim 11 wherein the forming comprises forming pellets.

15. The method of claim 11 comprising exposing the degradable polymeric material to water and degrading the thermoplastic elastomeric material and degrading the alloy particles.

16. The method of claim 11 wherein the compounding comprises reactive compounding.

17. A bore tool comprising:

a degradable polymeric material that comprises a thermoplastic elastomeric matrix and alloy particles disposed at least in part within the matrix wherein the alloy particles comprise aluminum and gallium; and a joint that is made at least in part from the degradable polymeric material.

18. The bore tool of claim 17 comprising a member that is made at least in part from the degradable polymeric material wherein the member is in contact with a component of the bore tool.

* * * * *